US010476319B2

(12) United States Patent
Azami et al.

(10) Patent No.: US 10,476,319 B2
(45) Date of Patent: Nov. 12, 2019

(54) MAGNETIC RESONANCE POWER SUPPLY APPARATUS

(71) Applicant: FUJITSU LIMITED, Kawasaki-shi, Kanagawa (JP)

(72) Inventors: Toshihiro Azami, Yokosuka (JP); Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 15/860,309

(22) Filed: Jan. 2, 2018

(65) Prior Publication Data

US 2018/0145545 A1 May 24, 2018

Related U.S. Application Data

(63) Continuation of application No. PCT/JP2015/069797, filed on Jul. 9, 2015.

(51) Int. Cl.
*H01F 38/14* (2006.01)
*H02J 50/80* (2016.01)
(Continued)

(52) U.S. Cl.
CPC ............ *H02J 50/80* (2016.02); *H02J 7/0027* (2013.01); *H02J 7/025* (2013.01); *H02J 7/04* (2013.01); *H02J 50/12* (2016.02); *H02J 50/40* (2016.02)

(58) Field of Classification Search
CPC .. H02J 7/0027; H02J 7/025; H02J 7/04; H02J 50/40; H02J 50/12; H02J 50/80
See application file for complete search history.

(56) References Cited

U.S. PATENT DOCUMENTS 9,859,051 B2 * 1/2018 Ren ......................... H01F 38/14
2005/0068009 A1 3/2005 Aoki
(Continued)

FOREIGN PATENT DOCUMENTS

EP 2273650 A2 1/2011
EP 2755302 A1 7/2014
(Continued)

OTHER PUBLICATIONS

EESR—Extended European Search Report dated Apr. 4, 2018 for corresponding European Patent Application No. 15897743.9.
(Continued)

*Primary Examiner* — Alfonso Perez Borroto
*Assistant Examiner* — Esayas G Yeshaw
(74) *Attorney, Agent, or Firm* — Fujitsu Patent Center

(57) ABSTRACT

A communication circuit receives information enabling computation of a power supply efficiency of the highest-priority power receiving device when supplying power to the power receiving devices as the power supply targets. A power supply circuit is capable of supplying power to a plurality of power receiving devices. A processor computes the power supply efficiency of the highest-priority power receiving device when supplying power to the power receiving devices as the power supply targets, decides the power receiving devices as the power supply targets so that an estimated supplied power is within a power supply capacity of the power supply circuit when supplying power to the power receiving devices as the power supply targets, and controls power supply so as to supply power to the decided the power receiving devices as the power supply targets.

9 Claims, 34 Drawing Sheets

(51) Int. Cl.

| | |
|---|---|
| ***H02J 50/40*** | (2016.01) |
| ***H02J 50/12*** | (2016.01) |
| ***H02J 7/00*** | (2006.01) |
| ***H02J 7/02*** | (2016.01) |
| ***H02J 7/04*** | (2006.01) |

(56) References Cited

U.S. PATENT DOCUMENTS

2008/0164876 A1* 7/2008 Sakakura ............. G01R 33/385 324/318
2008/0303479 A1* 12/2008 Park ........................ H02J 7/025 320/108
2010/0181961 A1 7/2010 Novak et al.
2011/0221389 A1 9/2011 Won et al.
2011/0298297 A1 12/2011 Van Wageningen et al.
2012/0032632 A1* 2/2012 Soar ........................ H01F 38/14 320/108
2012/0112555 A1 5/2012 Toshimitsu et al.
2012/0200158 A1 8/2012 Takei
2013/0015720 A1 1/2013 Shimokawa et al.
2014/0035379 A1* 2/2014 Stevens ................. H02J 7/0013 307/104
2014/0143933 A1* 5/2014 Low ....................... G04C 10/00 2/170
2015/0097433 A1* 4/2015 Shichino ................... H02J 1/14 307/32
2015/0224883 A1* 8/2015 Ichikawa ................ B60L 50/40 320/108

FOREIGN PATENT DOCUMENTS

| | | |
|---|---|---|
| JP | 2005-110399 | 4/2005 |
| JP | 2010-22105 | 1/2010 |
| JP | 2010-268610 | 11/2010 |
| JP | 2012-519460 | 8/2012 |
| JP | 2012-182930 | 9/2012 |
| JP | 2013-523063 | 6/2013 |
| JP | 2014-176173 | 9/2014 |
| WO | 2010/097725 A1 | 9/2010 |
| WO | 2011/042974 | 4/2011 |
| WO | 2011/099071 | 8/2011 |

OTHER PUBLICATIONS

International Search Report and Written Opinion of the International Searching Authority(Form PCT/ISA/220, PCT/ISA/210, Form PCT/ISA/237), mailed in connection with PCT/JP2015/069797 and dated Oct. 6, 2015, with English translation (8 pages).

* cited by examiner

FIG. 9A

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 1 | 0 |
| D2 | 2 | 10 | 1 | 0 |
| D3 | 3 | 5 | 1 | 0 |

FIG. 9B

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 1 | 1 |
| D2 | 2 | 10 | 1 | 0 |
| D3 | 3 | 5 | 1 | 0 |

FIG. 9C

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 1 | 0 |
| D3 | 3 | 5 | 1 | 0 |

FIG. 9D

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 1 | 1 |
| D3 | 3 | 5 | 1 | 0 |

FIG. 9E

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 0 |
| D3 | 3 | 5 | 1 | 0 |

FIG. 9F

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 0 |
| D3 | 3 | 5 | 1 | 1 |

FIG. 9G

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 0 |
| D3 | 3 | 5 | 0 | 0 |

FIG. 9H

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 0 |
| D3 | 3 | 5 | 0 | 1 |

FIG. 9I

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 1 |
| D3 | 3 | 5 | 1 | 0 |

FIG. 9J

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 1 |
| D3 | 3 | 5 | 1 | 1 |

FIG. 9K

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 1 |
| D3 | 3 | 5 | 0 | 0 |

FIG. 9L

| ID | POWER SUPPLY PRIORITY LEVEL | RATED RECEIVED POWER (W) | EVALUATION TARGET FLAG | POWER SUPPLY TARGET FLAG |
|---|---|---|---|---|
| D1 | 1 | 20 | 0 | 1 |
| D2 | 2 | 10 | 0 | 1 |
| D3 | 3 | 5 | 0 | 1 |

20
CPU
52
PRIMARY STORAGE UNIT
54
SECONDARY STORAGE UNIT
56
PARALLEL POWER RECEIVING CONTROL PROGRAM
55
ACCELERATION SENSOR
71A
GEOMAGNETIC SENSOR
71B
72
COMMUNICATION CIRCUIT
58
COMMUNICATION ANTENNA
60
POWER RECEIVING CIRCUIT
62
POWER RECEIVING ANTENNA
64
CHARGING CIRCUIT
66
BATTERY
68
POWER SOURCE CIRCUIT
70

FIG. 17

| STATE NUMBER | DISTANCE (cm) | DIRECTION (°) | ATTITUDE (°) | POWER SUPPLY EFFICIENCY |
|---|---|---|---|---|
| 1-20-0-0 | 20 | 0 | 0 | 0.8 |
| 1-20-0-30 | 20 | 0 | 30 | 0.7 |
| 1-20-0-60 | 20 | 0 | 60 | 0.4 |
| 1-20-0-90 | 20 | 0 | 90 | 0 |
| 1-20-30-0 | 20 | 30 | 0 | 0.7 |
| 1-20-30-30 | 20 | 30 | 30 | 0.6 |
| 1-20-30-60 | 20 | 30 | 60 | 0.3 |
| 1-20-30-90 | 20 | 30 | 90 | 0 |
| ... | ... | ... | ... | ... |

FIG. 18

| 1ST POWER RECEIVING DEVICE STATUS NUMBER | 2ND POWER RECEIVING DEVICE STATUS NUMBER | 2ND POWER RECEIVING DEVICE DISTANCE (CM) | 2ND POWER RECEIVING DEVICE DIRECTION (°) | 2ND POWER RECEIVING DEVICE ATTITUDE (°) | 1ST POWER RECEIVING DEVICE POWER SUPPLY EFFICIENCY | 2ND POWER RECEIVING DEVICE POWER SUPPLY EFFICIENCY |
|---|---|---|---|---|---|---|
| 1-20-0-0 | 2-20-0-0 | 20 | 0 | 0 | 0.4 | 0.4 |
| 1-20-0-0 | 2-20-0-30 | 20 | 0 | 30 | 0.5 | 0.3 |
| 1-20-0-0 | 2-20-0-60 | 20 | 0 | 60 | 0.6 | 0.2 |
| 1-20-0-0 | 2-20-0-90 | 20 | 0 | 90 | 0.8 | 0 |
| 1-20-0-0 | 2-20-30-0 | 20 | 30 | 0 | 0.5 | 0.3 |
| 1-20-0-0 | 2-20-30-30 | 20 | 30 | 30 | 0.6 | 0.2 |
| 1-20-0-0 | 2-20-30-60 | 20 | 30 | 60 | 0.7 | 0.1 |
| 1-20-0-0 | 2-20-30-90 | 20 | 30 | 90 | 0.8 | 0 |
| ... | ... | ... | ... | ... | ... | ... |

FIG. 23A

| POWER RECEIVING DEVICE | REMAINING BATTERY LEVEL (%) | POWER SUPPLY PRIORITY LEVEL |
|---|---|---|
| D1 | 50 | 3 |
| D2 | 20 | 1 |
| D3 | 30 | 2 |
| D4 | 70 | 4 |
| D5 | 90 | 5 |

FIG. 23B

| POWER RECEIVING DEVICE | TIME AVAILABLE FOR POWER SUPPLY (MIN.) | POWER SUPPLY PRIORITY LEVEL |
|---|---|---|
| D1 | 60 | 3 |
| D2 | 30 | 1 |
| D3 | 5 | 2 |
| D4 | 120 | 4 |
| D5 | 300 | 5 |

FIG. 23C

| POWER RECEIVING DEVICE | PRIORITY LEVEL | POWER SUPPLY PRIORITY LEVEL |
|---|---|---|
| D1 | 2 | 3 |
| D2 | 1 | 1 |
| D3 | 1 | 2 |
| D4 | 3 | 4 |
| D5 | 3 | 5 |

MAGNETIC RESONANCE POWER SUPPLY APPARATUS

CROSS-REFERENCE TO RELATED APPLICATION

This application is a continuation application of International Application PCT/JP2015/069797 filed on Jul. 9, 2015, the entire contents of which are incorporated herein by reference.

FIELD

The disclosed technology relates to a magnetic resonance power supply apparatus.

BACKGROUND

In the case in which power for charging a secondary battery is supplied from a power supply device to a power receiving device that operates on power charged in the secondary battery, "wireless power supply methods" that do not use a cable to supply power are becoming more widespread. Wireless power supply methods include electromagnetic induction methods, which have been commercialized in motorized toothbrushes, electric shavers, and the like, and magnetic resonance methods, which have not yet been commercialized fully, but are being commercialized. With magnetic induction methods, the power supply device and the power receiving device are brought into close proximity to supply power. On the other hand, with magnetic resonance methods, power supply (three-dimensional (3D) power supply) is possible in a state in which the power supply device and the power receiving device are from several dozen centimeters to several meters apart, and in addition, a single power supply device can supply power to a plurality of power receiving devices.

In relation to the above, technology that sets priority levels for a plurality of to-be-charged devices placed in a charging zone has been disclosed. Also, with this technology, there is disclosed technology that, when charging the plurality of to-be-charged devices in a non-contacting manner, decides a current distribution to provide for charging each to-be-charged device based on the priority level of each to-be-charged device.

CITATION LIST

Patent Literature

PTL 1: Japanese Laid-open Patent Publication No. 2010-268610

SUMMARY

According to an aspect of the invention, a communication circuit receives, from a highest-priority power receiving device having a highest power supply priority level from among a plurality of power receiving devices inside a power supply availability zone, information enabling computation of a power supply efficiency of the highest-priority power receiving device when supplying power to the power receiving devices as the power supply targets including the highest-priority power receiving device. A power supply circuit is capable of supplying power to the plurality of power receiving devices. A processor computes the power supply efficiency of the highest-priority power receiving device when supplying power to the power receiving devices as the power supply targets including the highest-priority power receiving device, from the information received by the communication circuit, and decides, based on the computed power supply efficiency of the highest-priority power receiving device, the power receiving devices as the power supply targets so that an estimated supplied power is within a power supply capacity of the power supply circuit when supplying power to the power receiving devices as the power supply targets including the highest-priority power receiving device, and controls power supply so as to supply power to the decided the power receiving devices as the power supply targets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9A is a conceptual diagram illustrating one example of a power receiving device information table according to the first embodiment.

FIG. 9B is a conceptual diagram illustrating one example of a power receiving device information table according to the first embodiment.

FIG. 9C is a conceptual diagram illustrating one example of a power receiving device information table according to the first embodiment.

FIG. 9D is a conceptual diagram illustrating one example of a power receiving device information table according to the first embodiment.

FIG. 9E is a conceptual diagram illustrating one example of a power receiving device information table according to the first embodiment.

FIG. 9F is a conceptual diagram illustrating one example of a power receiving device information table according to the first embodiment.

FIG. 9G is a conceptual diagram illustrating one example of a power receiving device information table according to the first embodiment.

FIG. 9H is a conceptual diagram illustrating one example of a power receiving device information table according to the first embodiment.

FIG. 9I is a conceptual diagram illustrating one example of a power receiving device information table according to the first embodiment.

FIG. 9J is a conceptual diagram illustrating one example of a power receiving device information table according to the first embodiment.

FIG. 9K is a conceptual diagram illustrating one example of a power receiving device information table according to the first embodiment.

FIG. 9L is a conceptual diagram illustrating one example of a power receiving device information table according to the first embodiment.

FIG. 17 is a conceptual diagram illustrating one example of a power supply efficiency table according to the third embodiment.

FIG. 18 is a conceptual diagram illustrating one example of a power supply efficiency table according to the third embodiment.

FIG. 23A is a conceptual diagram illustrating one example of power supply priority levels according to the fourth embodiment.

FIG. 23B is a conceptual diagram illustrating one example of power supply priority levels according to the fourth embodiment.

FIG. 23C is a conceptual diagram illustrating one example of power supply priority levels according to the fourth embodiment.

DESCRIPTION OF EMBODIMENTS

When supplying power to a power receiving device by a magnetic resonance method, the power supply efficiency of the power receiving device as power supply target changes depending on the number of the power receiving devices as the power supply targets, and the direction, distance, attitude, and the like of the power receiving device. The power supply efficiency is the received power of the power receiving device with respect to the supplied power from the power supply device. If the power supply efficiency of the power receiving device changes, the supplied power and the received power of the power receiving device also change. However, since the technology described above does not consider this point, a situation may occur in which the power supply capacity of the power supply device is not utilized effectively.

As one aspect of the disclosed technology, an objective is to make it possible to utilize the power supply capacity of a power supply device effectively in the case of supplying power to a power receiving device by a magnetic resonance method.

First Embodiment

Hereinafter, one example of an embodiment of the disclosed technology, namely a first embodiment, will be described in detail with reference to the drawings.

Figure 1:
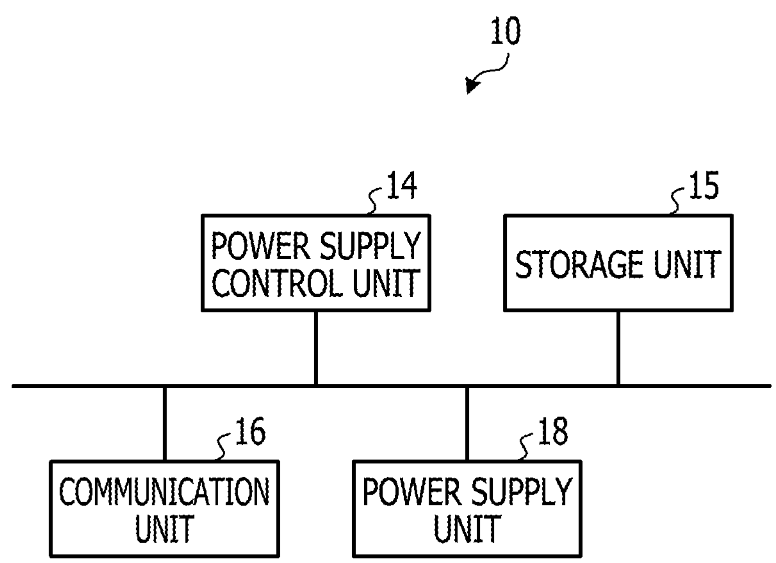
FIG. 1 is a block diagram illustrating one example of the major functions of a power supply device according to a first embodiment.
Figure 2:
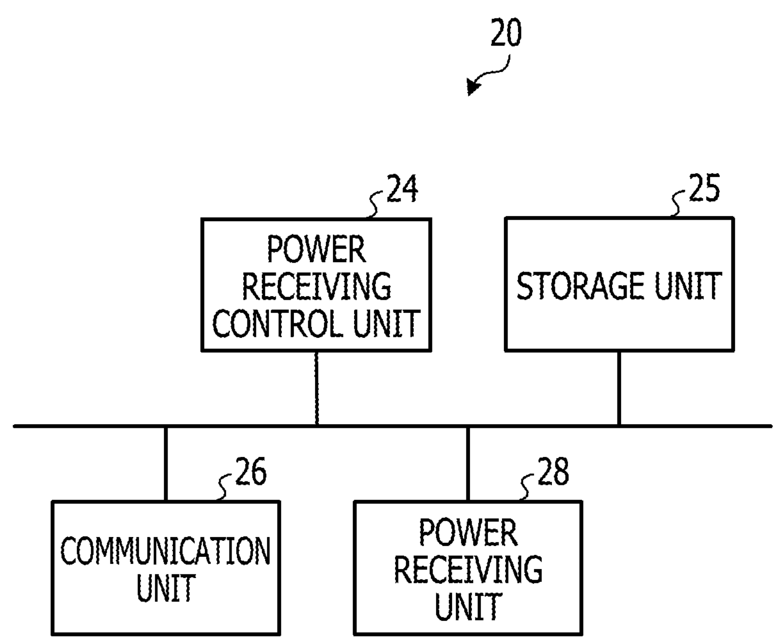
FIG. 2 is a block diagram illustrating one example of the major functions of a power receiving device according to the first embodiment.

As an example, FIG. 1 illustrates a power supply device 10. The power supply device 10 is a power supply device capable of supplying power in a wireless manner to a plurality of power receiving devices 20 (an example of which is illustrated in FIG. 2) by a magnetic resonance method. The power receiving device 20 is a device that receives power in a wireless manner from the power supply device 10.

The power supply device 10 includes a power supply control unit 14, a storage unit 15, a communication unit 16, and a power supply unit 18. The power supply control unit 14, the storage unit 15, the communication unit 16, and the power supply unit 18 are interconnected. The communication unit 16 is a wireless communication device that performs short-range wireless communication such as Bluetooth (registered trademark) or wireless LAN. Also, the communication unit 16 receives, from at least one power receiving device 20 among the plurality of power receiving devices 20 in a region in which power can be supplied, information enabling estimation of the power supply efficiency of one power receiving device 20 when supplying power to the power receiving devices 20 of the power supply targets, including the one power receiving device 20. The power supply unit 18 is capable of supplying power to the plurality of power receiving devices 20. The power supply control unit 14 estimates the power supply efficiency of at least one power receiving device 20 when supplying power to the power receiving devices 20 as the power supply targets, including the one power receiving device 20, from the information received by the communication unit 16. Also, based on the estimated power supply efficiency of the at least one power receiving device 20, the power supply control unit 14 decides the power receiving devices 20 as the power supply targets so that an estimated supplied power is within the power supply capacity of the power supply unit 18 when supplying power to the power receiving devices 20 as the power supply targets, including the one power receiving device 20. Also, the power supply control unit 14 controls the power supply unit 18 so that power is supplied to the decided the power receiving devices 20 as the power supply targets.

As an example, FIG. 2 illustrates the power receiving device 20. The power receiving device 20 includes a power receiving control unit 24, a storage unit 25, a communication unit 26, and a power receiving unit 28. The power receiving control unit 24, the storage unit 25, the communication unit 26, and the power receiving unit 28 are interconnected. The power receiving control unit 24 acquires and transmits information regarding the power receiving device 20 to the power supply device 10 through the communication unit 26, receives information from the power supply device 10 through the communication unit 26, and performs power receiving through the power receiving unit 28. Note that the communication unit 26 is a wireless communication device that performs short-range wireless communication such as Bluetooth (registered trademark) or wireless LAN, and communicates in a wireless manner with the communication unit 16 of the power supply device 10.

Figure 3:
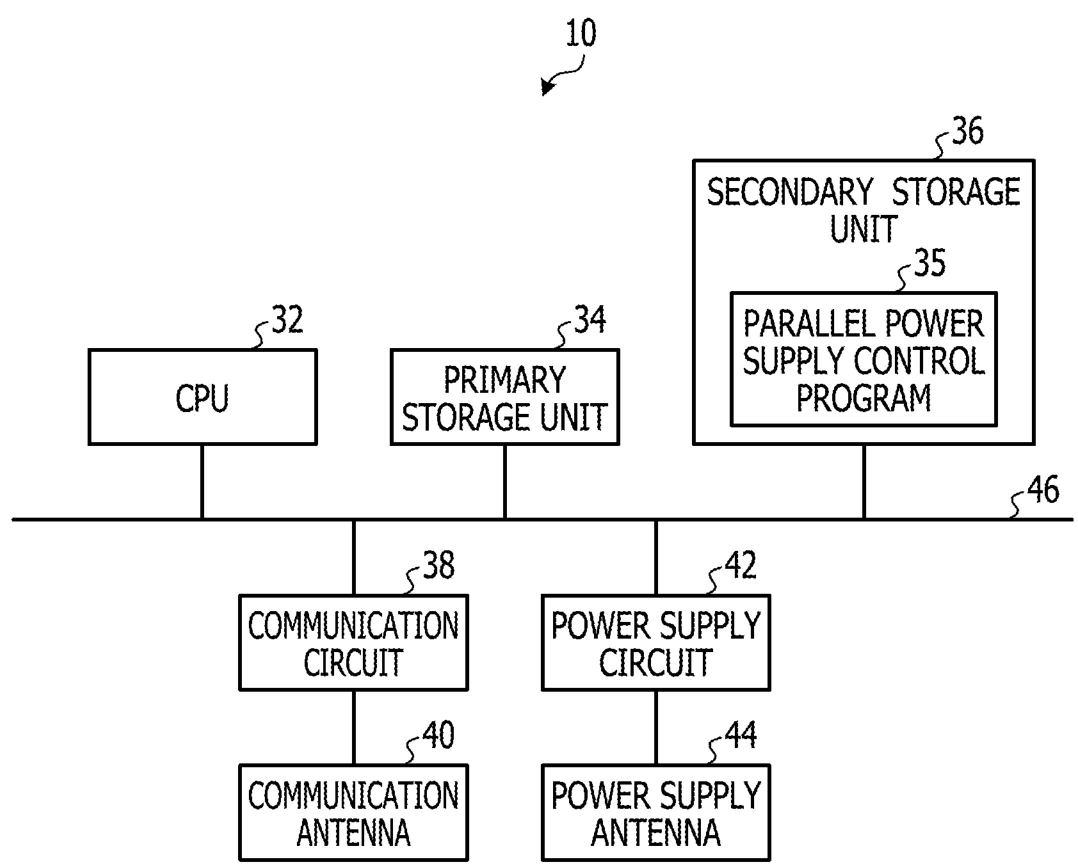
FIG. 3 is a block diagram illustrating one example of an electrical configuration of the power supply device according to the first embodiment.

As illustrated in FIG. 3, for example, the power supply device 10 includes a central processing unit (CPU) 32, a primary storage unit 34, a secondary storage unit 36, a communication circuit 38, a communication antenna 40, a power supply circuit 42, and a power supply antenna 44. The CPU 32, the primary storage unit 34, the secondary storage unit 36, the communication circuit 38, and the power supply circuit 42 are interconnected through a bus 46. The communication antenna 40 is interconnected with the communication circuit 38, and the power supply circuit 42 is connected to the power supply antenna 44.

The primary storage unit 34 is memory directly accessible from the CPU, such as random access memory (RAM) or read-only memory (ROM), for example. The secondary storage unit 36 is a storage device not directly accessible from the CPU, such as a hard disk drive (HDD) or a solid-state drive (SSD), for example.

In the case in which the parallel power supply control program 35 is stored in the secondary storage unit 36, the CPU 32 reads out and loads the parallel power supply control program 35 for executing a parallel power supply control process from the secondary storage unit 36 into the primary storage unit 34. By having the CPU 32 execute the parallel power supply control program 35, the power supply control unit 14 illustrated in FIG. 1 operates. The primary storage unit 34 and the secondary storage unit 36 correspond to the storage unit 15 of FIG. 1. The communication circuit 38 and the communication antenna 40 correspond to the communication unit 16 of FIG. 1, while the power supply circuit 42 and the power supply antenna 44 correspond to the power supply unit 18 of FIG. 1. In the case in which the parallel power supply control program 35 is stored in ROM, by having the CPU 32 execute the parallel power supply control program 35 stored in ROM, the CPU 32 operates as the power supply control unit 14 illustrated in FIG. 1.

Figure 4:
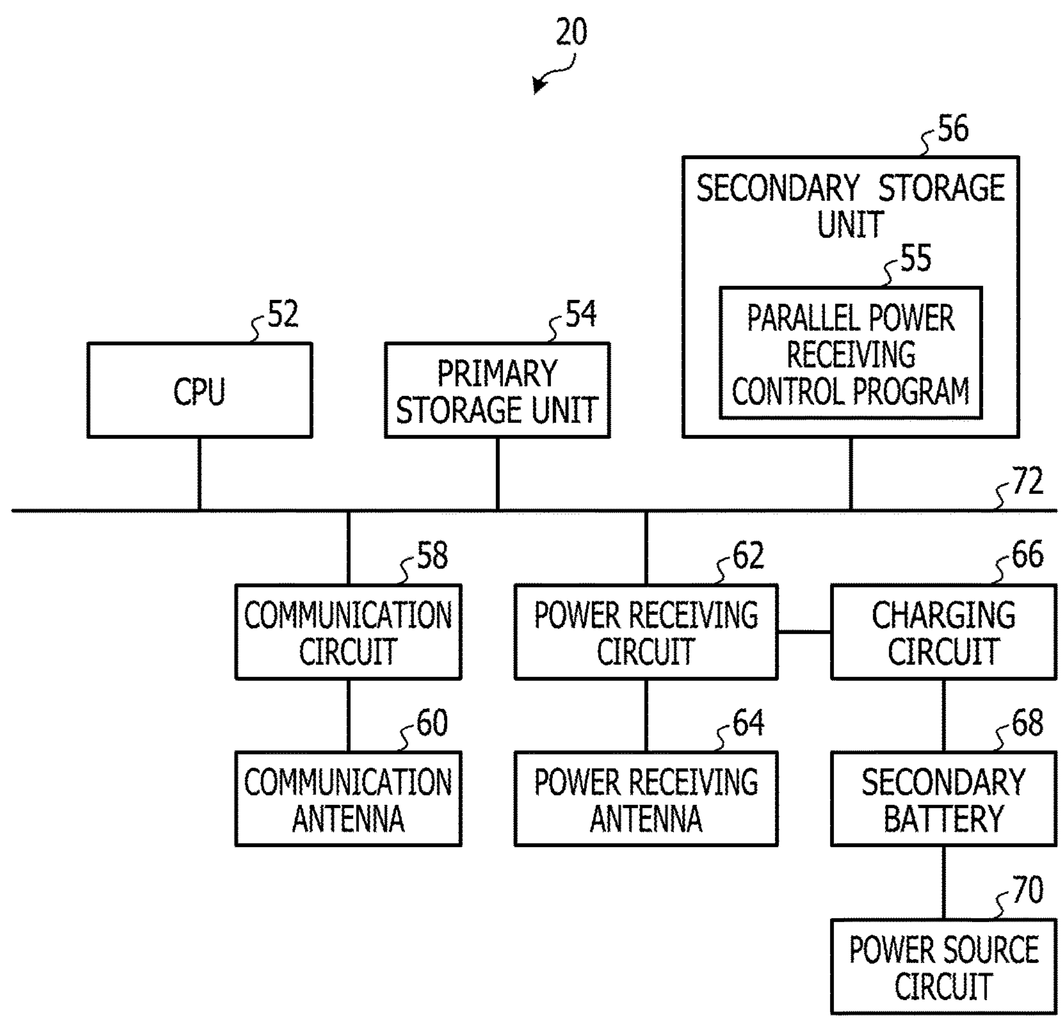
FIG. 4 is a block diagram illustrating one example of an electrical configuration of the power receiving device according to the first embodiment.

As illustrated in FIG. 4, for example, the power receiving device 20 includes a CPU 52, a primary storage unit 54, a secondary storage unit 56, a communication circuit 58, a communication antenna 60, a power receiving circuit 62, a power receiving antenna 64, a charging circuit 66, a secondary battery 68, and a power source circuit 70. The CPU 52, the primary storage unit 54, the secondary storage unit 56, the communication circuit 58, and the power receiving circuit 62 are interconnected through a bus 72. The communication antenna 60 is interconnected with the communication circuit 58, and the power receiving circuit 62 is connected to the power receiving antenna 64. The power receiving circuit 62 is connected to the charging circuit 66, the charging circuit 66 is connected to the secondary battery 68, and the secondary battery 68 is connected to the power source circuit 70.

The primary storage unit 54 is memory directly accessible from the CPU, such as random access memory (RAM) or read-only memory (ROM), for example. The secondary storage unit 56 is a storage device not directly accessible from the CPU, such as a hard disk drive (HDD) or a solid-state drive (SSD), for example.

In the case in which the parallel power receiving control program 55 is stored in the secondary storage unit 56, the CPU 52 reads out and loads the parallel power receiving control program 55 for executing a parallel power receiving control process from the secondary storage unit 56 into the primary storage unit 54. By having the CPU 52 execute the parallel power supply control program 55, the power receiving control unit 24 illustrated in FIG. 2 operates. The primary storage unit 54 and the secondary storage unit 56 correspond to the storage unit 25 of FIG. 2. The communication circuit 58 and the communication antenna 60 correspond to the communication unit 26 of FIG. 2, while the power receiving circuit 62 and the power receiving antenna 64 correspond to the power receiving unit 28 of FIG. 2. In the case in which the parallel power supply control program 55 is stored in ROM, by having the CPU 52 execute the parallel power receiving control program 55 stored in ROM, the CPU 52 operates as the power receiving control unit 24 illustrated in FIG. 2.

Figure 5A:
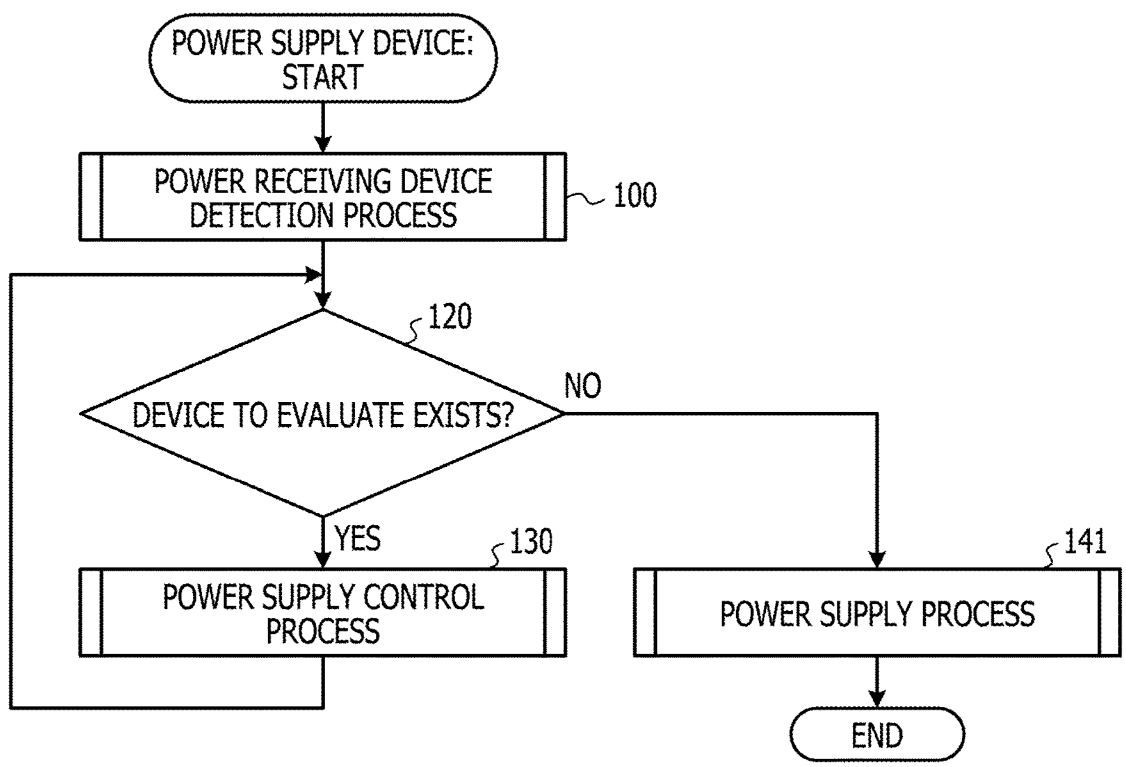
FIG. 5A is a flowchart illustrating one example of a parallel power supply control process by the power supply device according to the first embodiment.
Figure 5B:
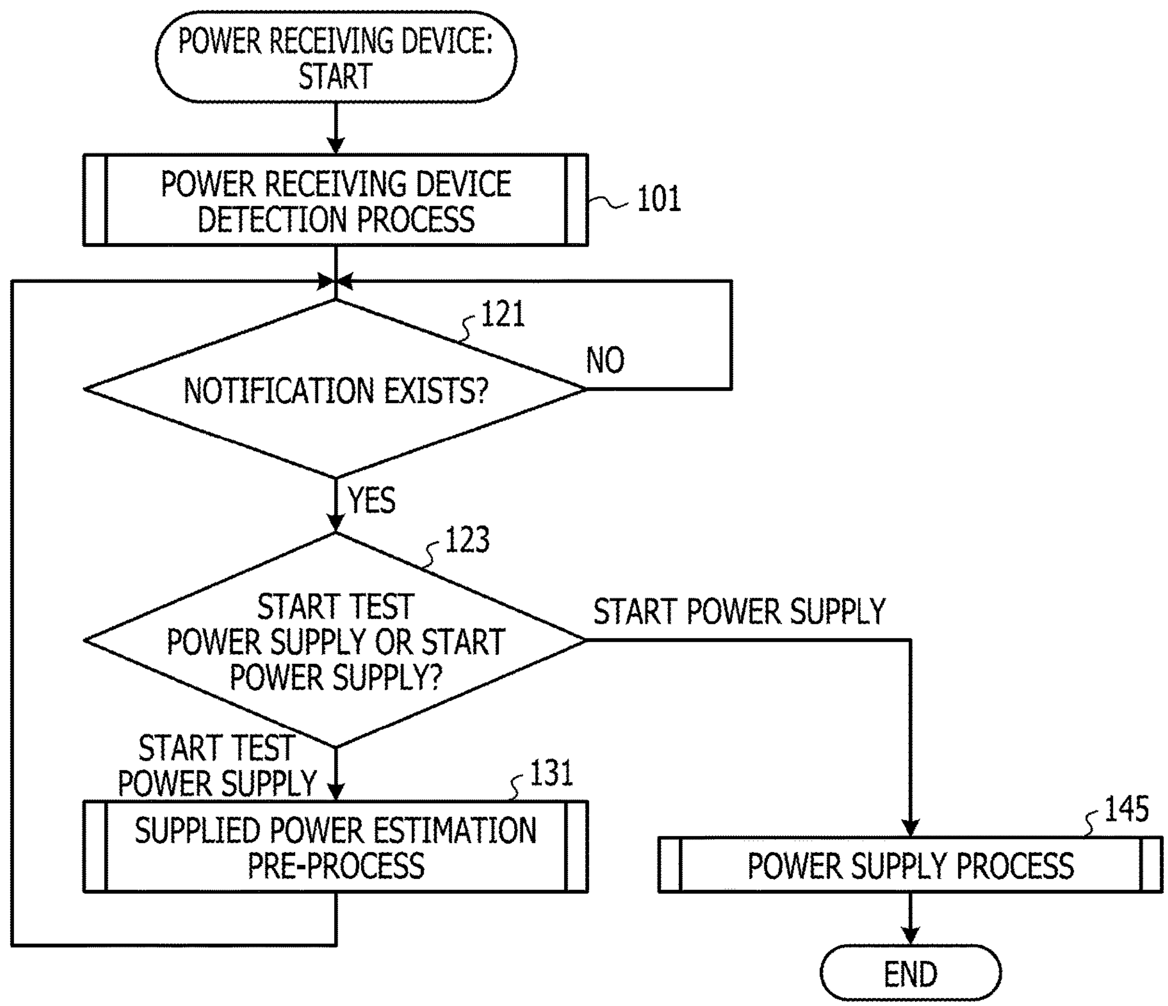
FIG. 5B is a flowchart illustrating one example of a parallel power receiving control process by the power receiving device according to the first embodiment.

Next, as an action of the present embodiment, the parallel power supply control process performed by the power supply device 10 will be described. FIG. 5A illustrates an example of the parallel power supply control process performed by the power supply device 10, while FIG. 5B illustrates an example of the parallel power supply control process performed by the power receiving device 20.

When a power source of the power supply device 10 is switched to the ON state, the power supply control unit 14 of the power supply device 10 executes the parallel power supply control process illustrated in FIG. 5A, and performs a power receiving device detection process in step 100. Also, if the device itself is placed in a region 80 in which power can be supplied of the power supply device 10 exemplified in FIG. 8, the power receiving control unit 24 of the power receiving device 20 executes the parallel power supply control process illustrated in FIG. 5B, and performs the power receiving device detection process in step 101. Details of the power receiving device detection process by the power supply device 10 are exemplified in FIG. 6, while details of the power receiving device detection process by the power receiving device 10 are exemplified in FIG. 7. The power receiving device 20 being placed in the region 80 in which power can be supplied is sensed according to a procedure like the following, for example. The power receiving device 20 monitors power supply from the power supply device 10 by determining a power receiving voltage in the power receiving circuit 62. If the power receiving voltage is sensed to be equal to or greater than a fixed voltage continuously for a fixed time, the power receiving device 20 determines that the power receiving device 20 itself has been placed in the region 80 in which power can be supplied.

Figure 8:
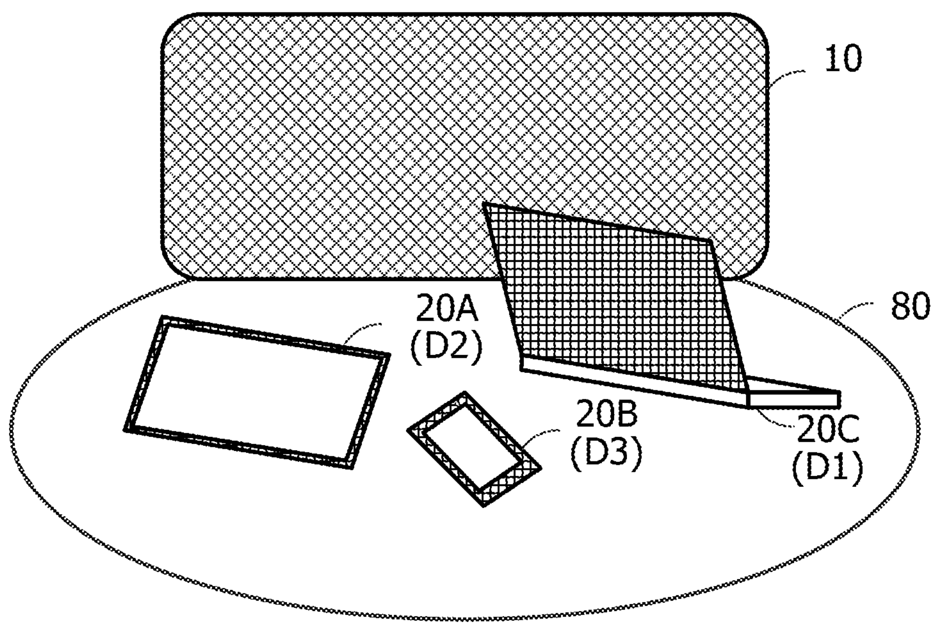
FIG. 8 is a conceptual diagram illustrating one example of the positions of a power supply device and power receiving devices according to the first embodiment.

FIG. 8 illustrates an example of the power supply availability zone 80 of the power supply device 10. The power supply device 10 is provided with a coil-shaped power supply antenna 44 inside a housing, and a magnetic field is formed around the power supply antenna 44. The region in which power may be supplied through the magnetic field is the power supply availability zone 80. In the power supply availability zone 80, N power receiving devices 20 with device IDs from D1 to DN are placed. Herein, to avoid complication, a power receiving device 20A with the device ID D1, a power receiving device 20B with the device ID D2, and a power receiving device 20C with the device ID D3 will be described as being placed in the power supply availability zone 80. In the following, the power receiving device 20A, the power receiving device 20B, and the power receiving device 20C will be collectively designated the power receiving devices 20. FIG. 8 illustrates an example of a vertically-oriented power supply device 10, but the power supply device 10 may also be horizontally oriented. In the case in which the power supply device 10 is horizontally oriented, the power supply availability zone 80 may also be on the top face of the power supply device 10. Also, the power receiving devices 20 may be a notebook PC, a tablet, a smartphone, and the like, for example.

Figure 6:
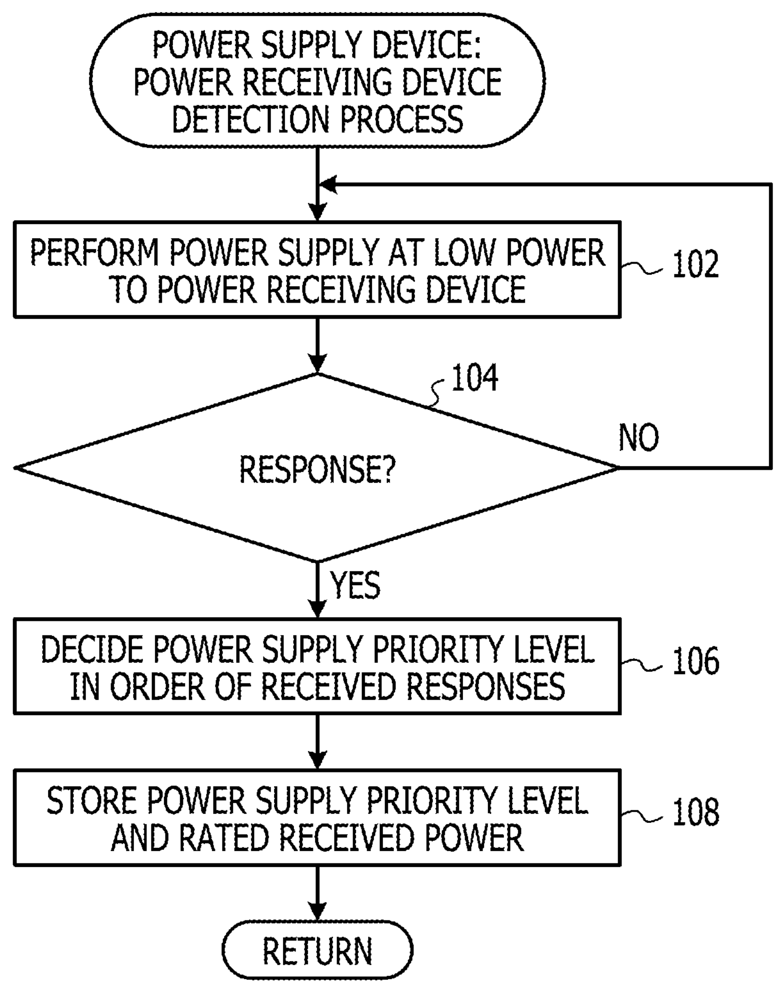
FIG. 6 is a flowchart illustrating one example of a power receiving device detection process by the power supply device according to the first embodiment.
Figure 7:
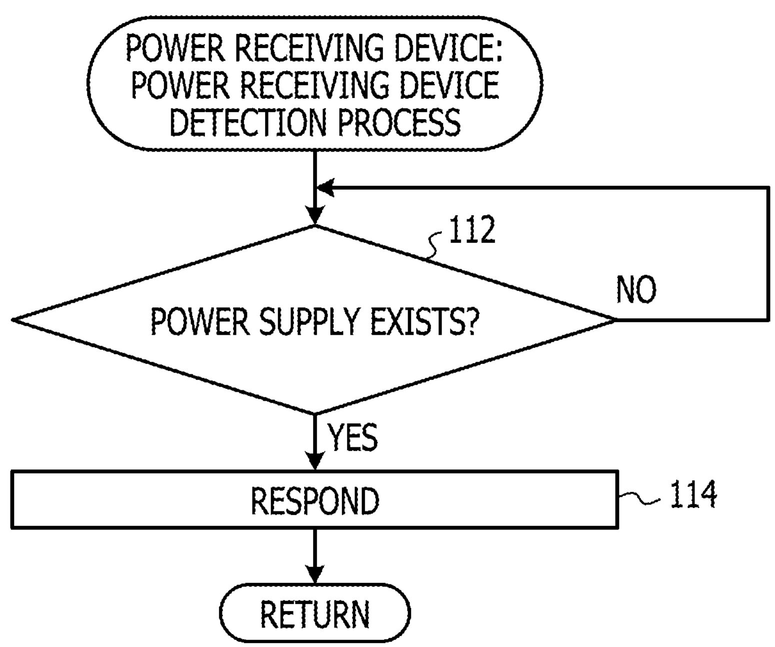
FIG. 7 is a flowchart illustrating one example of a power receiving device detection process by the power receiving device according to the first embodiment.

In step 102 of FIG. 6, the power supply control unit 14 of the power supply device 10 uses the power supply circuit 42 and the power supply antenna 44 to perform power supply at low power to the power receiving devices 20 in the region 80 in which power can be supplied. In step 112 of FIG. 7, the power receiving control unit 24 of the power receiving devices 20 uses the power receiving circuit 62 and the power receiving antenna 64 to determine whether or not a power supply from the power supply device 10 has been received, and stands by until power supply from the power supply device 10 is performed. If the determination in step 112 is positive, in step 114, the power receiving control unit 24 responds to the power supply device 10 by notifying the power supply device 10 of information such as the device ID and a rated received power of the power receiving device 20 itself. The rated received power is the maximum received power that the power receiving device 20 is capable of receiving. The received power is the power that the power receiving device 20 receives.

In step 102 and step 104 of FIG. 6, the power supply control unit 14 of the power supply device 10 repeats the power supply to the power receiving devices 20 at low power until responses from the power receiving devices 20 are received. In step 104, if the power supply control unit 14 determines that responses from the power receiving devices 20 have been received, in step 106, the power supply control unit 14 decides the power supply priority level of the power receiving devices 20. The power supply priority level is a priority level of power supply for each power receiving device 20 among the plurality of power receiving devices 20. Herein, as one example, the power supply device 10 decides the order in which the responses, that is, information was received from each power receiving device 20 in step 104 as the power supply priority level of each power receiving device 20.

In step 108, the power supply control unit 14 stores data generating a power receiving device information table, which includes the power supply priority level and the rated received power of the power receiving devices 20, in the secondary storage unit 36. As one example, as exemplified in FIG. 9A, the power supply priority level, the rated received power, an evaluation target flag, and a power supply target flag are stored in association with the device IDs of the power receiving devices 20. The evaluation target flag and the power supply target flag will be described later, but in the initial state, the evaluation target flag is set to 1 and the power supply target flag is set to 0 for all of the power receiving devices 20. Since a case in which there are three power receiving devices 20 is being illustrated as an example, in FIG. 9A, the power receiving device information table includes three records, but in the case in which there are N power receiving devices 20, there are N records in the power receiving device information table. Also, FIG. 9A illustrates an example in which the power supply control unit 14 of the power supply device 10 receives responses in the order of the power receiving device 20 (D1), the power receiving device 20 (D2), and the power receiving device 20 (D3) in step 104, and the power supply priority levels are decided in the order of the power receiving device 20 (D1), the power receiving device 20 (D2), and the power receiving device 20 (D3).

In step 120 of FIG. 5A, the power supply control unit 14 determines whether or not an evaluation target power receiving device 20 exists, or in other words, whether or not a power receiving device 20 with an evaluation target flag of 1 in FIG. 9A exists. In the case in which the determination of step 120 is positive, in step 130, the power supply control unit 14 performs a power supply control process. Details of the power supply control process are exemplified in FIG. 10.

Figure 10:
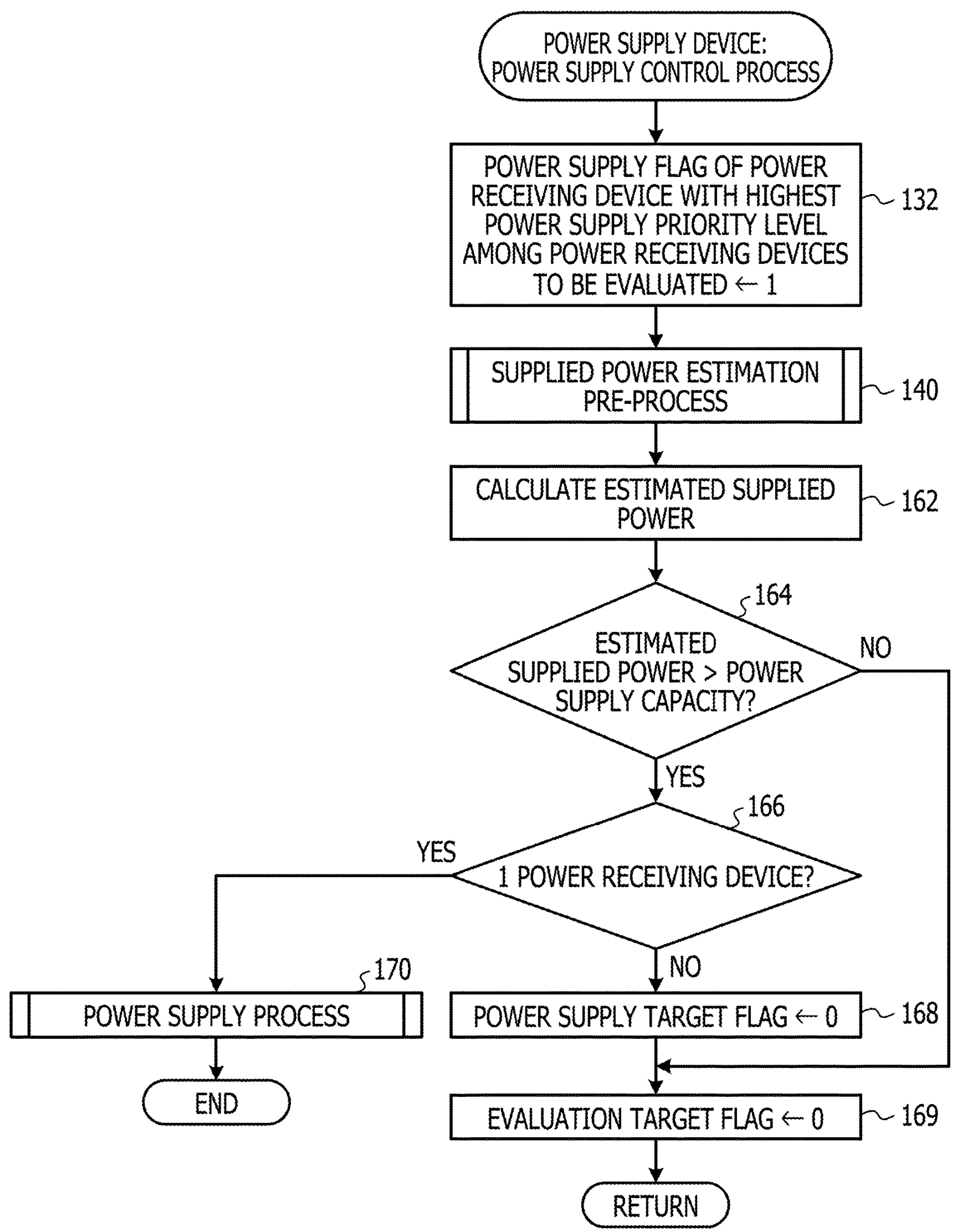
FIG. 10 is a flowchart illustrating one example of a power supply control process according to the first embodiment.

In step 132 of FIG. 10, the power supply control unit 14 selects the power receiving device 20 with the highest power supply priority level from among the power receiving devices 20 with an evaluation target flag of 1 as the power supply target, and changes the power supply target flag of the selected power receiving device 20 from 0 to 1. In other words, as exemplified in FIG. 9B, the power supply target flag of the power receiving device 20 (D1) with the power supply priority level 1 is changed from 0 to 1. A power receiving device 20 with a power supply target flag of 1 is a power receiving device 20 included among the power receiving devices 20 as the power supply targets. In step 140, the power supply control unit 14 performs a supplied power estimation pre-process. Details of the supplied power estimation pre-process are exemplified in FIG. 11.

Figure 11:
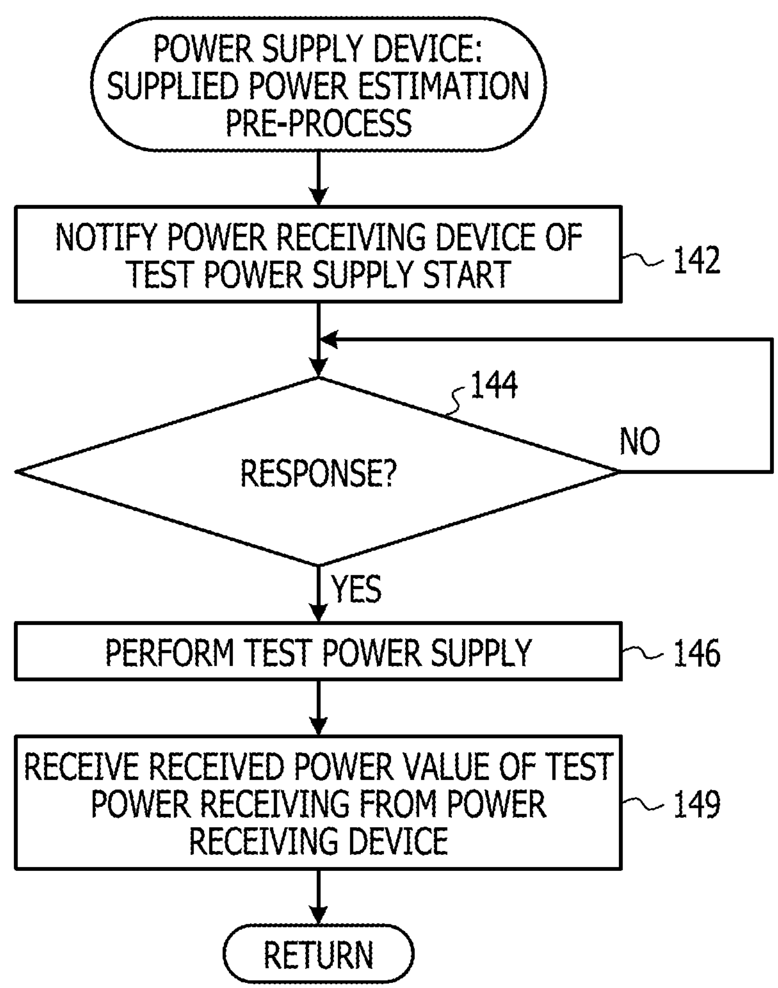
FIG. 11 is a flowchart illustrating one example of a supplied power estimation pre-process by the power supply device according to the embodiments.

In step 142 of the supplied power estimation pre-process illustrated in FIG. 11, the power supply control unit 14 of the power supply device 10 uses the communication circuit 38 and the communication antenna 40 to notify the power receiving devices 20 with the power supply target flag of 1 that a test power supply will be started. Herein, the power supply control unit 14 of the power supply device 10 notifies the power receiving device 20 (D1) that the test power supply will be started.

In step 121 of FIG. 5B, the power receiving control unit 24 of the power receiving device 20 determines whether or not a notification from the power supply device 10 has been received using the communication circuit 58 and the communication antenna 60, and stands by until the determination is positive. In step 121, if the power receiving control unit 24 determines that a notification from the power supply device 10 has been received, in step 123, the power receiving control unit 24 determines whether the received notification is a notification indicating that the test power supply will be started, or a notification indicating that the power supply described later will be started. In step 123, if the power receiving control unit 24 determines that the received notification is a notification indicating that the test power supply will be started, in step 131, the power receiving control unit 24 performs a supplied power estimation process. In step 154 of FIG. 12, the power receiving control unit 24 causes the power receiving circuit 62 to operate, and uses the communication circuit 58 and the communication antenna 60 to respond to the power supply device 10 by issuing a notification indicating that the preparations to perform the test power supply have been completed.

The power receiving circuit 62 includes a resonance circuit, and by the opening and closing of the resonance circuit, a state of resonating and a state of not resonating with the magnetic field oscillations of a resonance circuit included in the power supply device 10 are switched. By closing the resonance circuit, the resonating state is formed and power is received, whereas by opening the resonance circuit, the resonating state is not formed and power is not received.

In step 144 of FIG. 11, the power supply control unit 14 of the power supply device 10 stands by until a response from the power receiving device 20 is received. In step 144, if the power supply control unit 14 determines that a response from the power receiving device 20 has been received using the communication circuit 38 and the communication antenna 40, in step 146, the power supply control unit 14 uses the power supply circuit 42 and the power supply antenna 44 to perform the test power supply. In the test power supply, power of a tiny predetermined value is supplied for a short time from the power supply device 10 to the power receiving device 20. Herein, for example, 0.1 W of power is supplied for 1 s.

Figure 12:
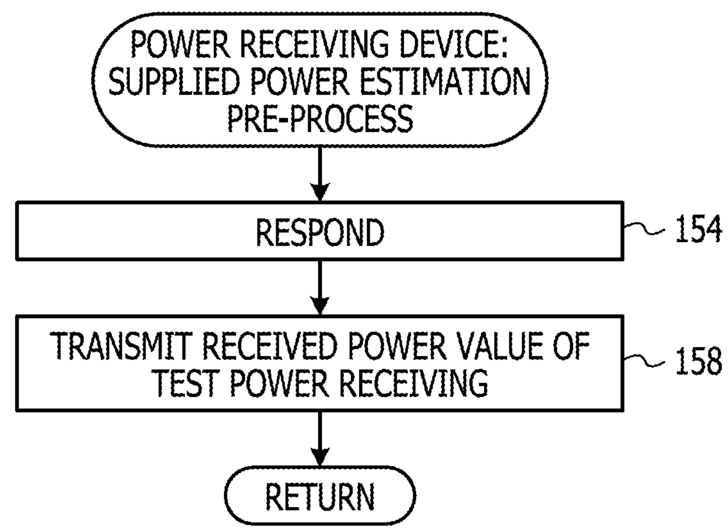
FIG. 12 is a flowchart illustrating one example of a supplied power estimation pre-process by the power receiving device according to the first embodiment.

In step 158 of FIG. 12, the power receiving control unit 24 of the power receiving device 20 uses the power receiving circuit 62 and the power receiving antenna 64 to receive the test power supply, and measure the received power. The power receiving control unit 24 uses the communication circuit 58 and the communication antenna 60 to transmit information expressing the measured received power to the power supply device 10. Note that after the test power supply is completed, the power receiving circuit 62 is stopped. With this arrangement, power is not received even if power is supplied from the power supply device 10.

In step 149 of FIG. 11, the power supply control unit 14 of the power supply device 10 uses the communication circuit 38 and the communication antenna 40 to receive a notification of the received power of the power receiving device 20 from all power receiving devices 20 with a power supply target flag of 1, or in other words, all the power receiving devices 20 of the power supply targets. Note that the received power received in step 149 is an example of the information enabling estimation of the power supply efficiency. In step 162 of FIG. 10, the power supply control unit 14 calculates the estimated supplied power using Formula (1).

$$Pt=PrrM\times(1/(PerM/Pet))=PrrM\times(Pet/PerM) \tag{1}$$

Herein, Pt is the estimated supplied power, PrrM is the rated received power of the power receiving device 20 with the highest power supply priority level, Pet is the supplied power of the test power supply performed in step 146, and PerM is the received power of the power receiving device 20 with the highest power supply priority level received in step 149.

As exemplified in FIG. 9A, suppose that the rated received power PrrM of the power receiving device 20 (D1) with a power supply priority level 1 is 20 W, the supplied power Pet of the test power supply is 0.1 W, and the received power PerM of the test power supply of the power receiving device 20 (D1) is 0.06 W. Also, suppose that the power supply capacity of the power supply device 10 is 50 W. In this case, the estimated supplied power Pt=20 W×(0.1 W/0.06 W)=33.33 W. PerM/Pet included in Formula (1) is called the power supply efficiency, and is the received power of a power receiving device with respect to the supplied power from a power supply device. The supplied power is the power that the power supply device supplies to the power receiving device, and in the case in which the power supply device supplies power to the plurality of power receiving devices in parallel, the supplied power is the sum of the power supplied to each of the power receiving devices. In other words, Formula (1) estimates the estimated supplied power for causing the power receiving device 20 with the highest power supply priority level to receive the rated received power based on the power supply efficiency when performing the test power supply.

Figure 13:
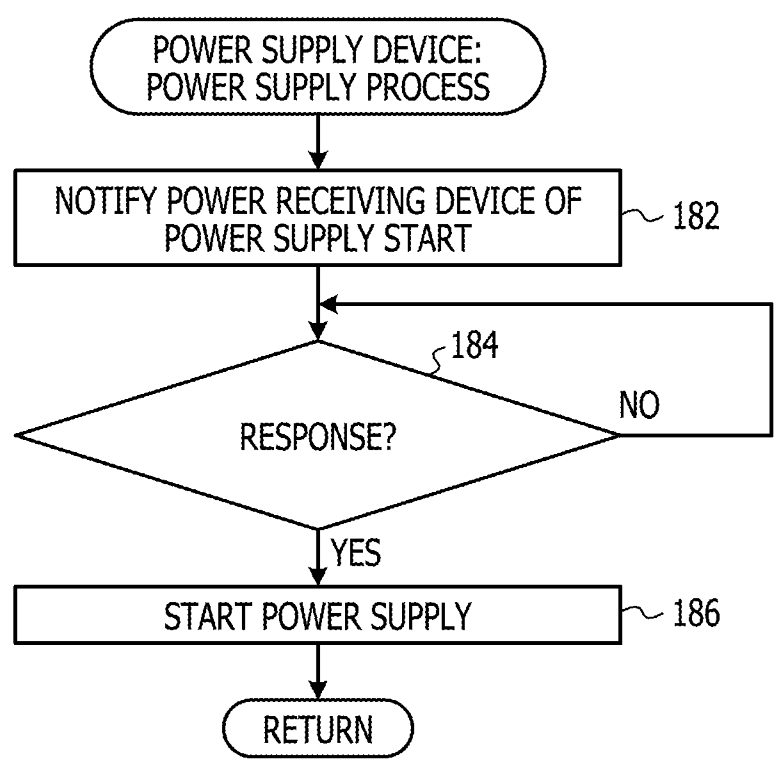
FIG. 13 is a flowchart illustrating one example of a power supply process by the power supply device according to the first embodiment.

In step 164, the power supply control unit 14 determines whether or not the estimated supplied power calculated in step 162 exceeds the power supply capacity (rated supply power: for example, 50 W) of the power supply device 10 (DT1). In the case in which the determination of step 164 is positive, in step 166, the power supply control unit 14 determines whether or not there is one power supply target power receiving device 20. In the case in which the determination of step 166 is positive, the power supply control unit 14 performs a power supply process in step 170. Details of the power supply process are exemplified in FIG. 13. In step 182, the power supply control unit 14 uses the communication circuit 38 and the communication antenna 40 to notify the power receiving device 20 with a power supply target flag of 1 that the power supply will be started.

In step 121 of FIG. 5B, the power receiving control unit 24 of the power receiving device 20 stands by until a notification from the power supply device 10 is received using the communication circuit 58 and the communication antenna 60. In step 121, if the power receiving control unit 24 determines that a notification from the power supply device 10 has been received, in step 123, the power receiving control unit 24 determines whether the received notification is a notification indicating that the test power supply will be started, or a notification indicating that the power supply will be started. In step 123, if the power receiving control unit 24 determines that a notification indicating that the power supply will be started has been received, in step 194, the power receiving control unit 24 causes the power receiving circuit 62 to operate, and uses the communication circuit 58 and the communication antenna 60 to respond to the power supply device 10. In the response, the power receiving control unit 24 issues a notification indicating that the preparations for receiving power have been completed.

Figure 14:
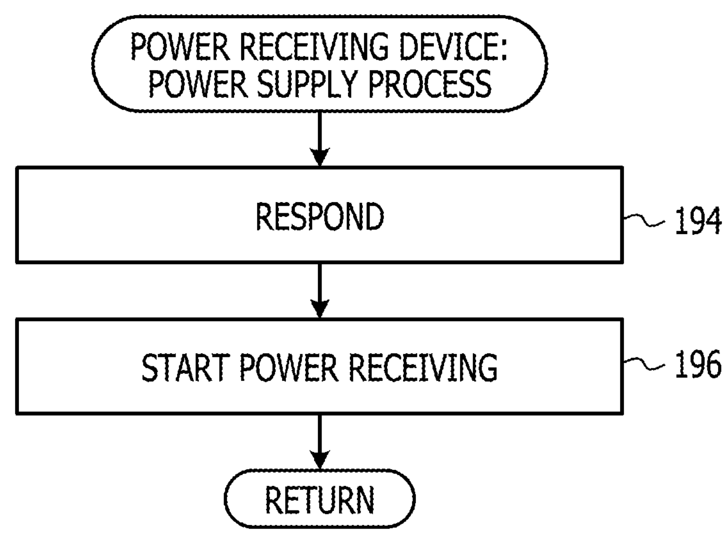
FIG. 14 is a flowchart illustrating one example of a power supply process by the power receiving device according to the first embodiment.

In step 184, the power supply control unit 14 of the power supply device 10 determines whether or not a response from the power receiving device 20 has been received, and repeats step 184 until the determination of step 184 is positive. In step 184, if the power supply control unit 14 determines that a response from the power receiving device 20 has been received using the communication circuit 38 and the communication antenna 40, in step 186, the power supply control unit 14 starts the power supply using the power supply circuit 42 and the power supply antenna 44. In step 196 of FIG. 14, the power receiving control unit 24 of the power supply device 10 starts power receiving using the power receiving circuit 62 and the power receiving antenna 64. The power receiving control unit 24 uses the charging circuit 66 to start charging the secondary battery 68 with the received power, and the parallel power supply control process ends. Note that when charging is completed, the power receiving control unit 24 of each power receiving device 20 stops the power receiving circuit 62. With this arrangement, power is not received even if power is supplied from the power supply device 10.

In the case in which only the power receiving device 20 with the highest power supply priority level is the power supply target, power supply is performed even in cases in which the estimated supplied power is less than the power supply capacity of the power supply device 10. That is, in the case in which only the power receiving device 20 (D1) is the power supply target, power supply to the power receiving device 20 (D1) is performed even in cases in which the estimated supplied power is less than the power supply capacity of the power supply device 10.

On the other hand, in the case in which the determination of step 164 (DT1) is negative, that is, in the case in which the estimated supplied power calculated in step 162 is less than or equal to the power supply capacity of the power supply device 10, such as in the case in which the estimated supplied power is 33.33 W and the power supply capacity is 50 W as described above, in step 169, the power supply control unit 14 of the power supply device 10 changes, from 1 to 0, the evaluation target flag of the power receiving device 20 with the highest power supply priority level among the power receiving devices 20 with an evaluation target flag of 1. Herein, as exemplified in FIG. 9C, the evaluation target flag of the power receiving device 20 (D1) is changed from 1 to 0.

In step 120 of FIG. 5A, the power supply control unit 14 of the power supply device 10 determines whether or not an evaluation target power receiving device 20 exists, or in other words, whether or not a power receiving device 20 with an evaluation target flag of 1 in FIG. 9C exists. In the case in which an evaluation target power receiving device 20 exists, in step 130, the power supply control unit 14 performs the power supply control process.

In step 132 of FIG. 10, the power supply control unit 14 selects the power receiving device 20 with the highest power supply priority level from among the power receiving devices 20 with an evaluation target flag of 1 as the power supply target. In other words, as exemplified in FIG. 9D, the power supply target flag of the power receiving device 20 (D2) with the power supply priority level 2 is changed from 0 to 1.

In step 140, the power supply control unit 14 performs the supplied power estimation pre-process. In step 142 of FIG. 11, the power supply control unit 14 uses the communication circuit 38 and the communication antenna 40 to notify the power receiving devices 20 (D1 and D2) with a power supply target flag of 1 that the test power supply will be started. In step 121 of FIG. 5B, the power receiving control unit 24 of the power receiving devices 20 (D1 and D2) with a power supply target flag of 1 stands by until a notification from the power supply device 10 is received using the communication circuit 58 and the communication antenna 60. In step 121, if the power receiving control unit 24 determines that a notification from the power supply device 10 has been received, in step 123, the power receiving control unit 24 determines whether the received notification is a notification indicating that the test power supply will be started, or a notification indicating that the power supply will be started. In step 152, if the power receiving control unit 24 of the power receiving devices 20 (D1 and D2) determines that a notification indicating that the test power supply will be started has been received, in step 154, the power receiving control unit 24 causes the power receiving circuit 62 to operate, and responds to the power supply device 10 by using the communication circuit 58 and the communication antenna 60 to issue a notification indicating that the preparations for performing the test power supply have been completed. Herein, the power receiving device 20 (D1) and the power receiving device 20 (D2) with a power supply target flag of 1 respond to the power supply device 10.

In step 144 of FIG. 11, the power supply control unit 14 of the power supply device 10 stands by until responses from the power receiving devices 20 (D1 and D2) are received. In step 144 of FIG. 11, if the power supply control unit 14 determines that responses from the power receiving devices 20 have been received using the communication circuit 38 and the communication antenna 40, in step 146, the power supply control unit 14 uses the power supply circuit 42 and the power supply antenna 44 to perform the test power supply. In the test power supply, power of a tiny predetermined value is supplied for a short time. At this time, 0.1 W of power is supplied for 1 s to the power receiving device 20 (D1) and the power receiving device 20 (D2).

In step 158 of FIG. 12, the power receiving control unit 24 of the power receiving device 20 uses the power receiving circuit 62 and the power receiving antenna 64 to receive the test power supply. The power receiving control unit 24 of the power receiving devices 20 (D1 and D2) measures the received power of the corresponding power receiving device 20, and uses the communication circuit 58 and the communication antenna 60 to transmit a notification of the measured received power.

In step 149 of FIG. 11, the power supply control unit 14 of the power supply device 10 uses the communication circuit 38 and the communication antenna 40 to receive the notifications of the received power of the power receiving devices 20 (D1 and D2). In step 162 of FIG. 10, the power supply control unit 14 uses Formula (1) to calculate the estimated supplied power of the power receiving device 20 (D1) with the highest power supply priority level.

Provided that the rated received power PrrM of the power receiving device 20 (D1) is 20 W, the supplied power Pet of the test power supply is 0.1 W, and the received power PerM of the test power supply of the power receiving device 20 (D1) is 0.05 W, the estimated supplied power Pt=20 W×0.1 W/0.05 W=40 W. As described above, when calculating the estimated supplied power, only the rated received power and the received power of the test power supply for the power receiving device 20 with the highest power supply priority level are used.

In the case of supplying power to two or more power receiving devices 20 in parallel, the power supply efficiency of the power receiving device 20 with the highest power supply priority level (PerM/Pet) becomes lower than in the case of supplying power to one power receiving device 20. In the present embodiment, whereas the power supply efficiency is 0.6 (=0.06/0.1) in the case of performing the test power supply with the D1 alone, the power supply efficiency for D1 is 0.5 (=0.05/0.1) in the case of performing the test power supply to the two of D1 and D2. This lowering occurs because the supplied power is supplied to a power receiving device 20 other than the power receiving device 20 with the highest power supply priority level, and the received power of the power receiving device 20 with the highest power supply priority level decreases. According to Formula (1), if the power supply efficiency (PerM/Pet) falls, the estimated supplied power Pt increases. In other words, according to Formula (1) which includes only the power supply efficiency of the power receiving device 20 with the highest power supply priority level, since the supplied power to a power receiving device 20 other than the power receiving device 20 with the highest power supply priority level is also compensated for, Formula (1) enables estimation of the estimated supplied power to the combined power receiving devices 20.

The estimated supplied power for D1 in the case of performing the test power supply to the two of D1 and D2 is 40 W, and does not exceed the rated power supply capacity of the power supply device 10, namely 50 W. Consequently, power supply to the combination of D1 and D2 is judged to be possible. At this time, in the case in which the computed estimated supplied power for D1 exceeds the rated power supply capacity of the power supply device 10, namely 40 W, adequate power supply to the power receiving device 20 with the highest power supply priority level, namely D1, may not be performed, and thus power supply to the combination of D1 and D2 is judged not to be possible.

In step 164, the power supply control unit 14 determines whether or not the estimated supplied power calculated in step 162 exceeds the power supply capacity of the power supply device 10 (DT2). In the case in which the determination of step 164 is positive, in step 166, the power supply control unit 14 determines whether or not there is one power receiving device 20 with a power supply target flag of 1. In the case in which the number of power receiving devices 20 with a power supply target flag of 1 is not one, the determination of step 166 is negative. In step 168, the power supply control unit 14 changes, from 1 to 0, the power supply target flag of the power receiving device 20 with the highest power supply priority level from among the power receiving devices 20 with an evaluation target flag of 1, and in step 169, changes the evaluation target flag of the power receiving device 20 from 1 to 0. Herein, as exemplified in FIG. 9E, the power supply target flag of the power receiving device 20 (D2) is changed from 1 to 0, and the evaluation target flag of the power receiving device 20 (D2) is changed from 1 to 0.

In step 120 of FIG. 5A, the power supply control unit 14 determines whether or not an evaluation target power receiving device 20 exists, or in other words, whether or not a power receiving device 20 with an evaluation target flag of 1 in FIG. 9E exists. In step 132 of FIG. 10, the power supply control unit 14 selects the power receiving device 20 with the highest power supply priority level from among the power receiving devices 20 with an evaluation target flag of 1 as the power supply target. In other words, as exemplified in FIG. 9F, the power supply flag of the power receiving device 20 (D3) with the power supply priority level 3 is changed from 0 to 1.

As described above, in the following, although details are omitted, the power supply control unit 14 performs step 140 and step 162 of FIG. 10, and performs the determination of step 164 (DT3). If the determination of step 164 is positive, as exemplified in FIG. 9G, in step 168, the power supply target flag of the power receiving device 20 (D3) is changed from 1 to 0, and in step 169, the evaluation target flag is changed from 1 to 0.

In step 120 of FIG. 5A, the power supply control unit 14 determines whether or not an evaluation target power receiving device 20 exists, or in other words, whether or not a power receiving device 20 with an evaluation target flag of 1 in FIG. 9G exists. Herein, the determination of step 120 is negative, and the power supply control unit 14 performs the power supply process in step 141. Since the power supply process of step 141 is similar to the power supply process of step 170 in FIG. 10, details are omitted. Herein, power is supplied to the power receiving device 20 (D1) with a power supply target flag of 1.

On the other hand, if the determination (DT3) of step 164 in FIG. 10 is negative, in step 169, the power supply control unit 14 changes the evaluation target flag of the power receiving device 20 (D3) from 1 to 0, as exemplified in FIG. 9H. In step 120 of FIG. 5A, the power supply control unit 14 determines whether or not an evaluation target power receiving device 20 exists, or in other words, whether or not a power receiving device 20 with an evaluation target flag of 1 in FIG. 9H exists. Herein, the determination of step 120 is negative, and the power supply control unit 14 performs the power supply process in step 141. Herein, power is supplied to the power receiving device 20 (D1) and the power receiving device 20 (D3) with a power supply target flag of 1.

At this point, for the sake of explanation, the description will return to the determination (DT2) of step 164. Suppose that the power receiving device information table is in the state exemplified in FIG. 9D. If the determination of step 164 is negative, in step 169, as exemplified in FIG. 9I, the evaluation target flag of the power receiving device 20 (D2) is changed from 1 to 0. In step 120 of FIG. 5A, the power supply control unit 14 determines whether or not an evaluation target power receiving device 20 exists, or in other words, whether or not a power receiving device 20 with an evaluation target flag of 1 in FIG. 9I exists. Herein, the determination of step 120 is positive, and the power supply control unit 14 performs the power supply control process of step 130.

In step 132, the power supply control unit 14 selects the power receiving device 20 with the highest power supply priority level from among the power receiving devices 20 with an evaluation target flag of 1 as the power supply target. In other words, as exemplified in FIG. 9J, the power supply target flag of the power receiving device 20 (D3) with the power supply priority level of 3 is changed from 0 to 1. The power supply control unit 14 performs step 140, step 162, and the determination of step 164 (DT4). If the determination of step 164 is positive, as exemplified in FIG. 9K, in step 168, the power supply target flag of the power receiving device 20 (D3) is changed from 1 to 0, and in step 169, the power supply target flag of the power receiving device 20 (D3) is changed from 1 to 0.

In step 120 of FIG. 5A, the power supply control unit 14 determines whether or not an evaluation target power receiving device 20 exists, or in other words, whether or not a power receiving device 20 with an evaluation target flag of 1 in FIG. 9K exists. Herein, the determination of step 120 is negative, and the power supply control unit 14 performs the power supply process in step 141. In step 141, power is supplied to the power receiving device 20 (D1) and the power receiving device 20 (D2) with a power supply target flag of 1.

In the case in which the determination (DT4) of step 164 in FIG. 10 is negative, in step 169, the power supply control unit 14 changes the evaluation target flag of the power receiving device 20 (D3) from 1 to 0, as exemplified in FIG. 9L. In step 120 of FIG. 5A, the power supply control unit 14 determines whether or not an evaluation target power receiving device 20 exists, or in other words, whether or not a power receiving device 20 with an evaluation target flag of 1 in FIG. 9L exists. Herein, the determination of step 120 is negative, and the power supply control unit 14 performs the power supply process in step 141. In step 141, power is supplied to the power receiving device 20 (D1), the power receiving device 20 (D2), and the power receiving device 20 (D3) with a power supply target flag of 1.

Note that, to avoid complexity, a case is described in which the number N of power receiving devices 20 is 3, but the present embodiment is not limited thereto, and the number N of power receiving devices 20 may also be 4 or more.

With the magnetic resonance method, it is difficult to acquire the power supply efficiency in the case in which power supply to two power receiving devices is performed in parallel from the power supply efficiency in the case in which power supply is performed to each of the power receiving devices. In other words, simply computing the sum of the supplied powers in the case of supplying power to each of the power receiving devices does not result in the supplied power in the case of supplying power to the plurality of power receiving devices.

In the present embodiment, in the case in which the plurality of power receiving devices exist in the power supply availability zone of the power supply device, the rated received power is supplied to the power receiving device with the highest power supply priority level, and in addition, in the case in which the supplied power is less than the power supply capacity of the power supply device, power supply to other power receiving devices is examined. In other words, the power supply device assumes performing power supply at the rated received power with respect to the power receiving device with the highest power supply priority level, and estimates the estimated supplied power to the power receiving device.

In the case of assuming that power is supplied to the power receiving device with the highest power supply priority level, if the estimated supplied power is less than the power supply capacity of the power supply device, the estimated supplied power is estimated for the case of supplying power in parallel to the power receiving device with the highest power supply priority level and the power receiving device with the second-highest power supply priority level. In this case, it is assumed that power supply is performed at the rated received power to the power receiving device with the highest power supply priority level, but it is also assumed that the power supply to the power receiving device with the second-highest power supply priority level does not have to satisfy the rated received power.

In the case of assuming that power is supplied in parallel to the power receiving device with the highest power supply priority level and the power receiving device with the second-highest power supply priority level, if the estimated supplied power is less than the power supply capacity of the power supply device, power supply in parallel to the power receiving device with the highest power supply priority level and the power receiving device with the second-highest power supply priority level is determined to be possible. In the case in which the estimated supplied power is less than the power supply capacity of the power supply device, other power receiving devices are added one at a time to the power receiving devices combined as the targets of power supply, in order of the power supply priority level. Likewise in this case, it is assumed that power supply is performed at the rated received power to the power receiving device with the highest power supply priority level, but it is also assumed that the power supply to the power receiving devices other than the power receiving device with the highest power supply priority level does not have to satisfy the rated received power of each power receiving device.

In the case of assuming that power is supplied in parallel to the power receiving device with the highest power supply priority level and the power receiving device with the second-highest power supply priority level, if the estimated supplied power is greater than the power supply capacity of the power supply device, the power receiving device with the second-highest power supply priority level and the power receiving device with the third-highest power supply priority level are interchanged. In other words, the estimated supplied power is estimated for the case of supplying power in parallel to the power receiving device with the highest power supply priority level and the power receiving device with the third-highest power supply priority level. Power supply according to a parallel power supply control like the above is performed on the N power receiving devices placed in the power supply availability zone of the power supply device.

By performing a parallel power supply control like the above, in the present embodiment, it becomes possible to perform power supply that gives priority to power receiving devices with a high power supply priority level, and in addition, in the case of attempting to supply power in parallel to the plurality of power receiving devices, it becomes possible to utilize the power supply capacity of the power supply device effectively.

Second Embodiment

Next, one example of an embodiment of the disclosed technology, namely a second embodiment, will be described. Description will be omitted for the configuration and action which are similar to the first embodiment.

Figure 15:
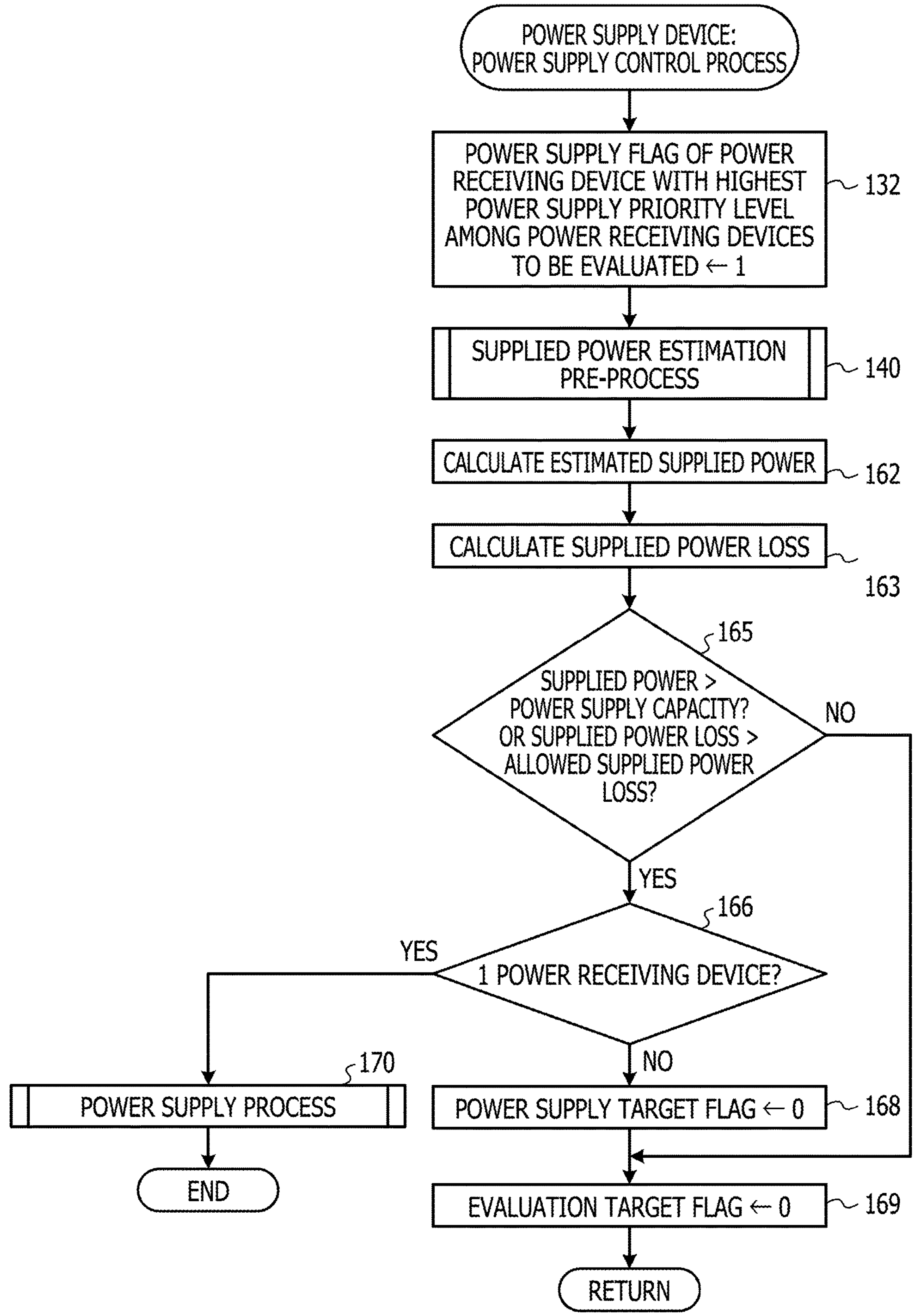
FIG. 15 is a flowchart illustrating one example of a power supply control process according to the second embodiment.

In the action of the second embodiment, the power supply control process in step 130 of FIG. 5A of the first embodiment is changed from the power supply control process exemplified in FIG. 10 to the power supply control process exemplified in FIG. 15. Step 163 and step 165 of FIG. 15 replace step 164 of the power supply control process of FIG. 10. Hereinafter, step 163 and step 165 of FIG. 15 which differ from the first embodiment will be described.

In step 163, the power supply control unit 14 of the power supply device 10 calculates a supplied power loss. The supplied power loss is calculated by subtracting the estimated received power Pt×((PerM+Perm)/Pet) from the estimated supplied power Pt. In other words, the supplied power loss is calculated according to Formula (2).

$$Pl=Pt-Pt\times((PerM+Perm)/Pet)=Pt\times(1-(PerM+Perm)/Pet) \quad (2)$$

Pl is the supplied power loss, Pt is the estimated supplied power, PerM is the received power during the test power supply of the power receiving device 20 with the highest power supply priority level, and Perm is the sum of the received power during the test power supply for all power receiving devices 20 other than the power receiving device 20 with the highest power supply priority level included in the combined power receiving devices 20. Also, Pet is the supplied power during the test power supply.

(PerM+Perm)/Pet included in Formula (2) is the sum of the received power with respect to the supplied power of the test power supply, or in other words, the power supply efficiency. According to Formula (2), if the power supply efficiency decreases, the supplied power loss increases.

Herein, the case in which the power supply target flag is 1 for the power receiving device 20 (D1) and the power receiving device 20 (D2) will be examined. In the case in which the supplied power of the test power supply is 0.1 W, the received power of the power receiving device 20 (D1) is 0.05 W, and the received power of the power receiving device 20 (D2) is 0.025 W, when the rated received power of the power receiving device 20 (D1) is 20 W, from Formula (1) the estimated supplied power to the power receiving device 20 (D1) and the power receiving device 20 (D2) is 20 W×(0.1/0.05)=40 W. Also, from Formula (2), the value of the supplied power loss of the power receiving device 20 (D1) and the power receiving device 20 (D2) is 40 W×(1−(0.05 W+0.025 W)/0.1 W)=40 W×(1−0.075 W/0.1 W)=40 W×(1−0.75)=40 W×0.25=10 W.

In other words, in the estimation of the supplied power loss, the value of the received power Perm of the power receiving device 20 (D2) other than the power receiving device 20 (D1) with the highest power supply priority level is also used.

In step 165 of FIG. 15, it is determined whether or not the estimated supplied power exceeds the power supply capacity of the power supply device 10, or whether or not the estimated supplied power loss exceeds an allowed supplied power loss of the power supply device 10. Step 165 of FIG. 15 differs from step 164 of the first embodiment in the point of determining whether or not the estimated supplied power loss exceeds the allowed supplied power loss of the power supply device 10.

If the determination of step 165 is positive, and in step 166 it is determined that there is one power receiving device 20 with a power supply target flag of 1, in step 170, the power supply process is performed. In other words, in the case in which there is one power receiving device 20 with a power supply target flag of 1, power supply to the power receiving device 20 is performed even if the determination of step 165 is positive. In this case, there is a possibility of the supplied power loss exceeding the allowed supplied power loss of the power supply device 10, but the power supply is performed by adjusting the supplied power, namely, decreasing the supplied power, so that the supplied power loss does not exceed the allowed power loss of the power supply device 10.

The energy of the supplied power loss produces heat in the power supply device 10. If the heat produced in the power supply device 10 exceeds an allowed amount, there is a possibility of producing a hindrance to the operation of the power supply device 10. Consequently, in the present embodiment, the supplied power loss is controlled so as not to exceed the allowed supplied power loss.

In the present embodiment, by performing a parallel power supply control as above, it becomes possible to perform power supply that gives priority to power receiving devices with a high power supply priority level, and in addition, in the case of attempting to supply power in parallel to the plurality of power receiving devices, it becomes possible to utilize the power supply capacity of the power supply device effectively. In the case of performing power supply by prioritizing a power receiving device with a high power supply priority level, and also attempting to supply power in parallel to the plurality of power receiving devices, the power supply loss is further controlled so as not to exceed the allowed power supply loss. Consequently, it is possible to avoid the occurrence of a hindrance to the operation of the power supply device due to generated heat in the power supply device exceeding the allowed amount.

Third Embodiment

Figure 16:
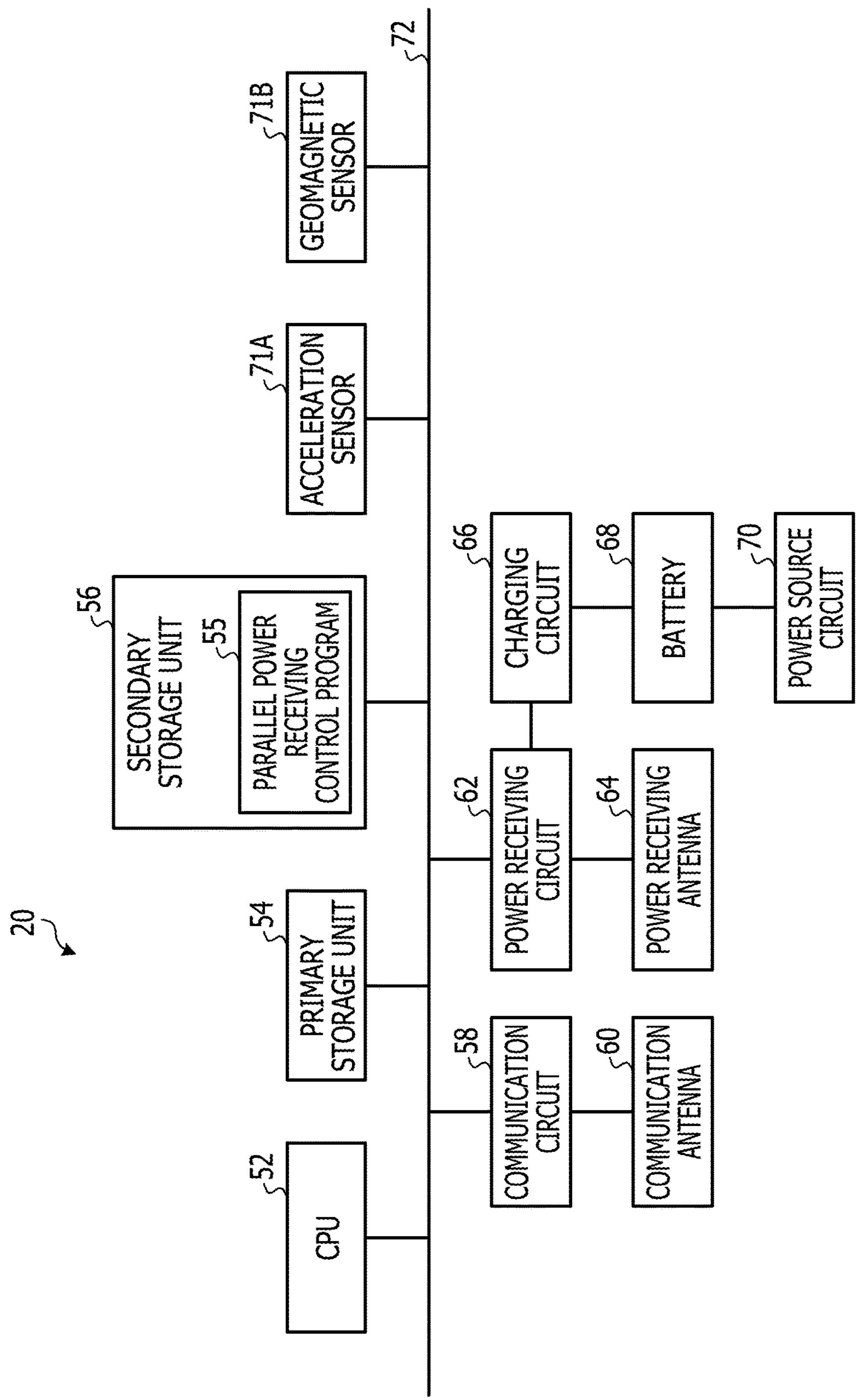
FIG. 16 is a block diagram illustrating one example of an electrical configuration of the power receiving device according to the third embodiment.

Next, one example of an embodiment of the disclosed technology, namely a third embodiment, will be described. Description will be omitted for the configuration and action which are similar to the first embodiment. As exemplified in FIG. 16, the power receiving device 20 of the third embodiment differs from the power receiving device 20 of the first embodiment in the point of including an acceleration sensor 71A and a geomagnetic sensor 71B. Also, the secondary storage unit 36 of the power supply device 10 stores data generating a power supply efficiency table, part of which is exemplified in FIGS. 17 and 18.

In the power supply efficiency table exemplified in FIG. 17, the power supply efficiency of the power receiving device 20 in the case in which there is one power receiving device 20 with a power supply target flag of 1 is recorded in association with a status number, a distance, a direction, and an attitude. The distance is the distance between the power supply device 10 and the power receiving device 20, while the direction is the direction of the power receiving device 20 from the perspective of the power supply device 10. Also, the attitude is the direction in which the power receiving device 20 is facing from the perspective of the power supply device 10.

In the power supply efficiency table exemplified in FIG. 18, the power supply efficiencies of a first power receiving device 20 and a second power receiving device 20 in the case in which there are two power receiving devices 20 with a power supply target flag of 1 are stored. The power supply efficiencies of the first power receiving device 20 and the second power receiving device 20 are stored in association with the status number of the first power receiving device 20, the status number of the second power receiving device 20, the distance of the second power receiving device 20, the direction of the second power receiving device 20, and the attitude of the second power receiving device 20. To avoid complexity, in the power supply efficiency table of FIG. 18, instead of including the distance, direction, and attitude of the first power receiving device 20, the status number of the power supply efficiency table of FIG. 17 is included as the status number of the first power receiving device 20.

Figure 19A:
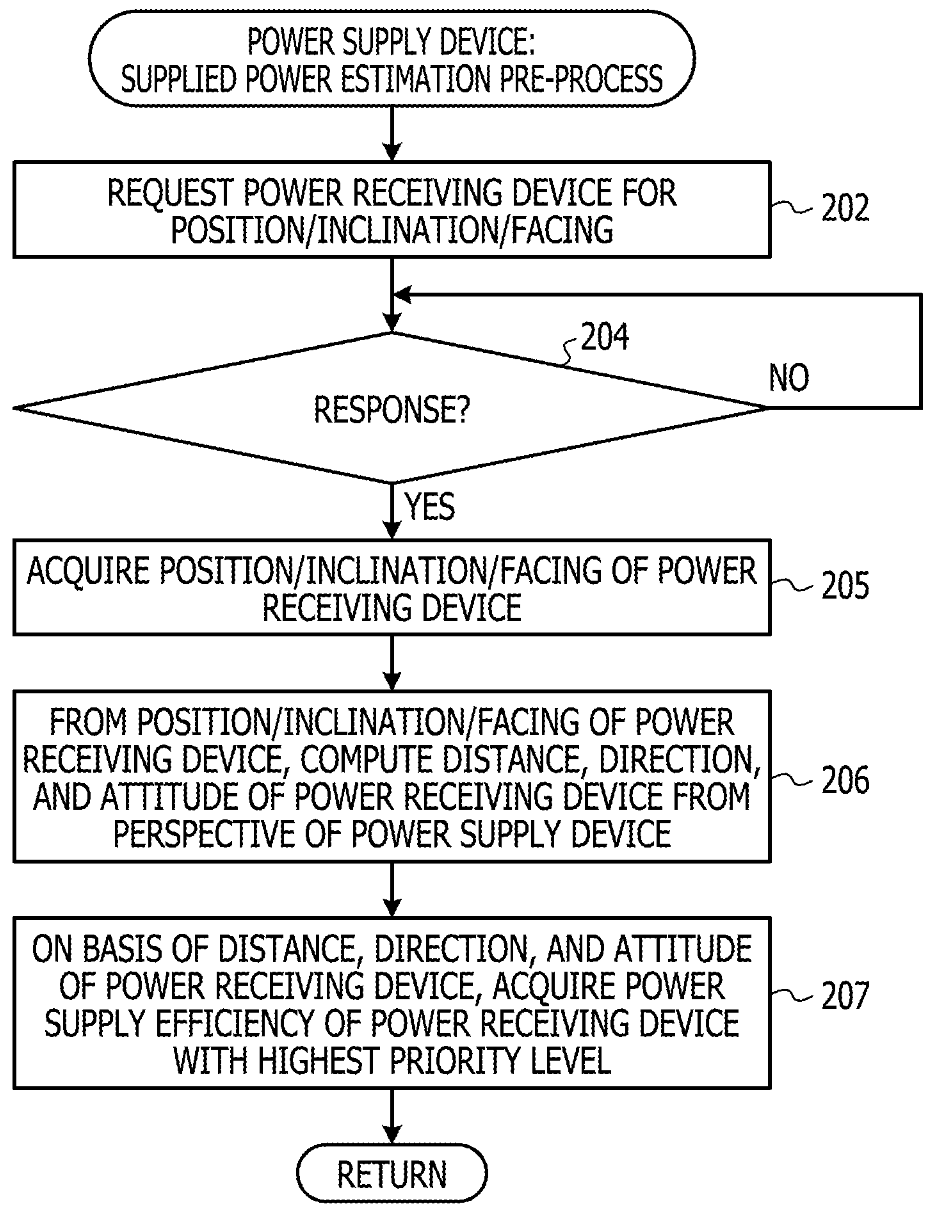
FIG. 19A is a flowchart illustrating one example of a supplied power estimation pre-process by the power supply device according to the third embodiment.

In the third embodiment, the supplied power estimation pre-process of step 140 in the power supply control process of FIG. 10 is different from the first embodiment. In the third embodiment, instead of the supplied power estimation pre-process exemplified in FIG. 11, the supplied power estimation pre-process of FIG. 19A is performed. In step 202 of FIG. 19A, the power supply control unit 14 of the power supply device 10 uses the communication circuit 38 and the communication antenna 40 to request the power receiving device 20 with a power supply target flag of 1 to transmit the position, inclination, and facing of the power receiving device 20.

The position is information for computing the distance and the direction of the power receiving device 20 from the perspective of the power supply device 10, and is a position in spatial coordinates of the power receiving device 20 or the power supply device 10. Also, the inclination is the installation angle of the power receiving device 20 in the vertical direction, while the facing is the installation angle of the power receiving device 20 in the horizontal direction. Note that the distance, direction, and attitude of the power receiving device 20 may also be measured not by the power receiving device 20, but instead from the power supply device 10 by viewing the power receiving device 20 with a camera, for example.

Figure 5C:
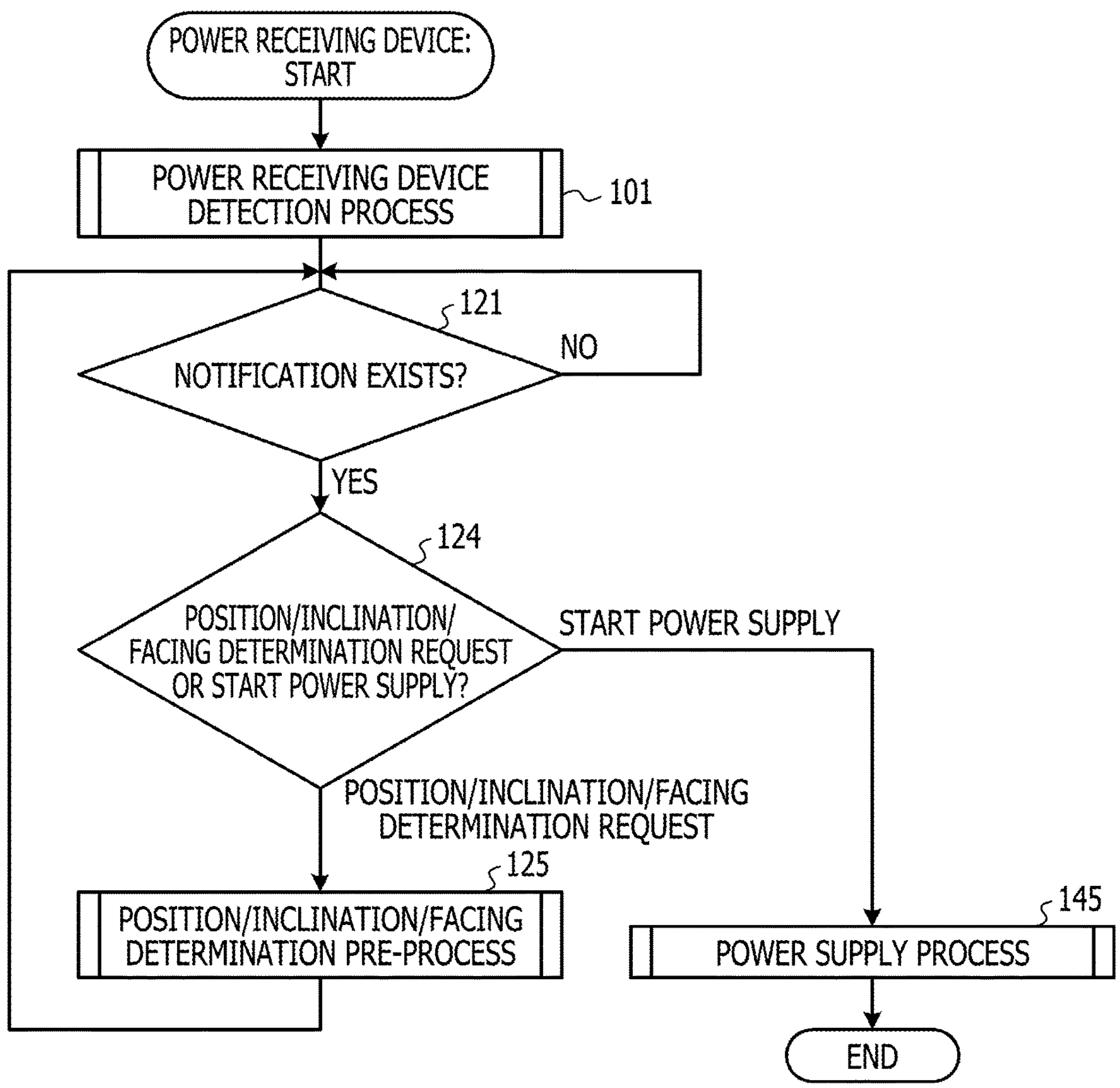
FIG. 5C is a flowchart illustrating one example of a parallel power receiving control process by the power receiving device according to a third embodiment.

In step 121 of FIG. 5C, the power receiving control unit 24 of the power receiving device 20 stands by until a notification from the power supply device 10 is received using the communication circuit 58 and the communication antenna 60. In step 121, if the power receiving control unit 24 determines that a notification from the power supply device 10 has been received, in step 124, the power receiving control unit 24 determines whether the received notification is a notification requesting the position, inclination, and facing of the power receiving device 20, or a notification indicating that the power supply will be started. In step 124, if the power receiving control unit 24 determines that the received notification is a notification requesting the position, inclination, and facing of the power receiving device 20, the power receiving control unit 24 performs a position/inclination/facing measurement process in step 125.

Figure 20:
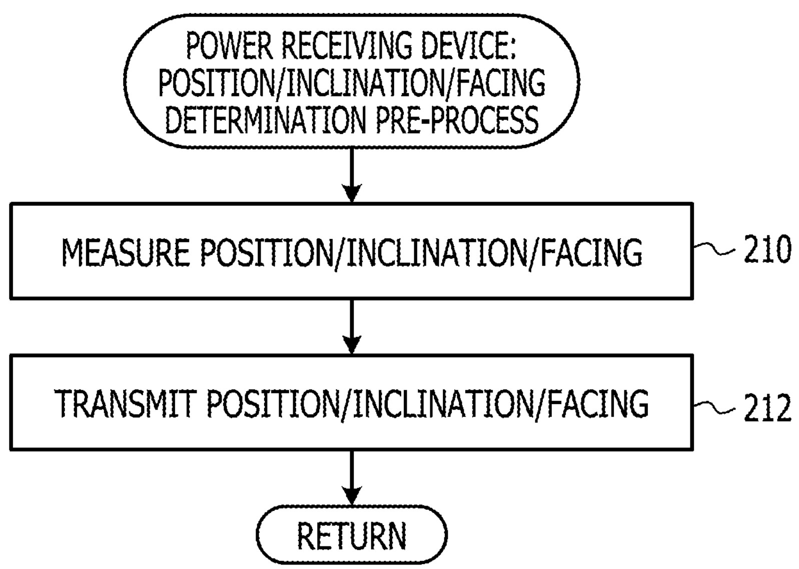
FIG. 20 is a flowchart illustrating one example of a position/inclination/facing determination pre-process by the power receiving device according to the third embodiment.

In step 210 of FIG. 20, the power receiving control unit 24 of the power receiving device 20 measures the position, inclination, and facing, or in other words status information, regarding the power receiving device 20. The power receiving control unit 24 of the power receiving device 20 measures the inclination and the facing of the power receiving device 20 by sensing the inclination of the power receiving device 20 with respect to the gravitational direction with the acceleration sensor 71A of the power receiving device 20, and by sensing the facing of the power receiving device 20 with the geomagnetic sensor 71B. The geomagnetic sensor 71B measures the direction of magnetism at the position where the geomagnetic sensor 71B exists. In the case of using a three-axis geomagnetic sensor 71B, measurement of the three-dimensional facing of the power receiving device 20 becomes possible, and thus the acceleration sensor 71A does not have to be used.

The power receiving device 20 uses a positioning system whose positional relationship with the power supply device 10 is known to measure the position at which the power receiving device 20 exists. The positioning system may be the Global Positioning System (GPS), an indoor positioning system, or the like, for example. Since GPS is capable of acquiring latitude, longitude, and altitude information as absolute coordinates, by ascertaining in advance the latitude, longitude, and altitude of the power supply device 10, the positional relationship between the power supply device 10 and the power receiving device 20 is ascertained. With an indoor positioning system, for example, the power receiving device 20 receives radio waves from a plurality of antennas whose positional relationships with the power supply device 10 are known, and by having the power receiving device 20 analyze the radio waves, the power receiving device 20 uses a positioning algorithm similar to GPS to ascertain the position of itself.

In step 212, the power receiving control unit 24 of the power receiving device 20 uses the communication circuit 58 and the communication antenna 60 to respond by transmitting the position, inclination, and facing measured in step 210 to the power supply device 10. In step 204 of FIG. 19A, the power supply control unit 14 of the power supply device 10 stands by until a response from the power receiving device 20 is received. In step 204 of FIG. 19A, if the power supply control unit 14 determines that a response from the power receiving device 20 has been received using the communication circuit 38 and the communication antenna 40, in step 205, the power supply control unit 14 acquires the position, inclination, and facing of the power receiving device 20 with a power supply target flag of 1.

In step 206, based on the position, inclination, and facing of the power receiving device 20, the power supply control unit 14 computes the distance, direction, and attitude of the power receiving device 20 from the perspective of the power supply device 10. For example, the power supply device 10 compares the position of the power supply device 10 ascertained in advance by GPS, an indoor positioning system, or the like to the position of the power receiving device 20, and thereby ascertains the positional relationship between the power supply device 10 and the power receiving device 20. Also, the attitude of the power receiving device 20 from the perspective of the power supply device 10 is ascertained from the positional relationship between the power supply device 10 and the power receiving device 20, and the inclination and facing of the power receiving device 20.

In step 206, the power supply control unit 14 of the power supply device 10 references the power supply efficiency table of FIGS. 17 and 18, and acquires the power supply efficiency of the power receiving device 20 with the highest power supply priority level corresponding to the acquired distance, direction, and attitude.

In the case in where there is one power receiving device 20 with a power supply target flag of 1, the power supply efficiency table of FIG. 17 is referenced to acquire the power supply efficiency corresponding to the distance, direction, and attitude closest to the distance, direction, and attitude of the power receiving device 20.

In the case in where there are two power receiving devices 20 with a power supply target flag of 1, the power supply efficiency table of FIG. 17 is referenced to acquire the status number corresponding to the distance, direction, and attitude closest to the distance, direction, and attitude of one of the two power receiving devices 20. Additionally, the power supply efficiency table of FIG. 18 is referenced to acquire the status number, and power supply efficiency corresponding to the distance, direction, and attitude closest to the distance, direction, and attitude of the other of the two power receiving devices 20.

In step 162 of FIG. 10, the power supply control unit 14 of the power supply device 10 calculates the estimated supplied power. The estimated supplied power is calculated using Formula (3).

$$Pt = PrrM \times (1/PefM) \tag{3}$$

Formula (3) is derived by replacing PerM/Pet expressing the power supply efficiency in Formula (1) with the power supply efficiency PefM acquired from FIG. 17 or 18.

Figure 19B:
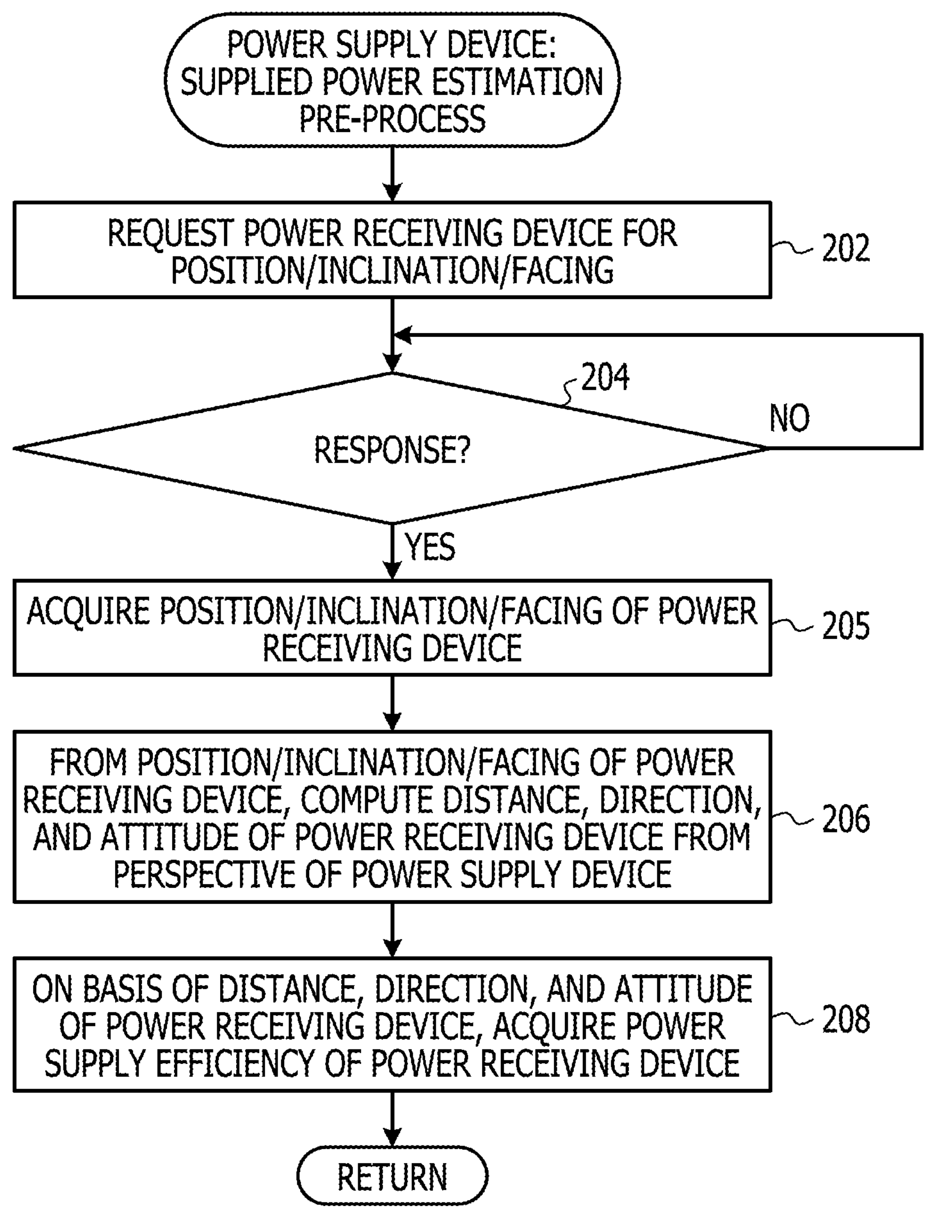
FIG. 19B is a flowchart illustrating one example of a supplied power estimation pre-process by the power supply device according to the third embodiment.

Note that although a case of applying the third embodiment to the first embodiment is described, the third embodiment may also be applied to the second embodiment. In the case of applying the third embodiment to the second embodiment, the supplied power estimation pre-process of FIG. 19B is performed instead of the supplied power estimation pre-process of FIG. 19A. In FIG. 19B, step 208 of FIG. 19B is performed instead of step 207 of FIG. 19A. In other words, in step 208, the power supply control unit 14 of the power supply device 10 acquires not only the power supply efficiency of the power receiving device 20 with the highest power supply priority level, but also the power supply efficiency of all power receiving devices 20 with a power supply target flag of 1.

In step 163 of FIG. 15, the power supply control unit 14 of the power supply device 10 calculates the supplied power loss. The supplied power loss is calculated using Formula (4).

$$Pl=Pt\times(1-(PefM+Pefm)) \quad (4)$$

Formula (4) is derived by replacing (PerM+Perm)/Pet expressing the power supply efficiency in Formula (2) with PefM+Pefm. Pefm is the power supply efficiency of the power receiving devices 20 with a power supply target flag of 1 other than the power receiving device 20 with the highest power supply priority level. In the case in which there is one power receiving device 20 with a power supply target flag of 1, Pefm is 0. In the case in which three or more power receiving devices 20 with a power supply target flag of 1 exist, Pefm is the sum of the power supply efficiencies of the power receiving devices 20 other than the power receiving device 20 with the highest power supply priority level.

In the present embodiment, the power supply efficiency to a power receiving device 20 is estimated based on the distance, direction, and attitude of the power receiving device 20 with respect to the power supply device 10. Power supply efficiencies measured in advance for individual distances, directions, and attitudes of the power receiving device 20 with respect to the power supply device 10 are stored. Based on the measured distance, direction, and attitude of the power receiving device 20, a corresponding power supply efficiency is acquired from among the stored power supply efficiencies.

An example of referencing the power supply efficiency tables of FIGS. 17 and 18 to acquire the power supply efficiency corresponding to the distance, direction, and attitude closest to the distance, direction, and attitude of the power receiving device 20 is described, but the present embodiment is not limited thereto. For example, based on the distance, direction, and attitude of the power receiving device 20, a corresponding power supply efficiency may be acquired by interpolating between the power supply efficiencies of FIGS. 17 and 18.

Note that even in the case in which a power receiving device 20 lacks a function of measuring the position or attitude of itself, it is possible to measure the position or attitude of the power receiving device 20 from the power supply device 10. For example, a power receiving device 20 is specified, and a camera that measures the distance to the power receiving device 20 is used. To specify a power receiving device 20, an augmented reality (AR) marker attached to the surface of the power receiving device 20 is photographed with the camera. To measure the distance to the power receiving device 20, by photographing with a range image camera that uses infrared light, the distance to the power receiving device 20 specified by the AR marker is found. It is also possible to ascertain the attitude of the power receiving device 20 from the inclination of the AR marker. If the size of the AR marker is known, it is possible to determine the size of the AR maker in an image photographed with a typical camera, without using a range image camera, and thereby ascertain the distance to the power receiving device 20.

An example in which there is one or two power receiving devices 20 with a power supply target flag of 1 is described, but the present embodiment is not limited thereto. The present embodiment may also be applied to the case in which there are three or more power receiving devices 20. In the case in which there are three or more power receiving devices 20, a power supply efficiency table for the case of three or more power receiving devices is also stored in the secondary storage unit 36.

The intervals of distance, direction, and attitude in FIGS. 17 and 18 (for example, intervals of every 20 cm for distance, and intervals of every 30° for direction and attitude) are an example, and the present embodiment is not limited thereto.

In the present embodiment, by performing a parallel power supply control as above, it becomes possible to perform power supply that gives priority to power receiving devices with a high power supply priority level, and in addition, in the case of attempting to supply power in parallel to the plurality of power receiving devices, it becomes possible to utilize the power supply capacity of the power supply device effectively. In the case of performing power supply by prioritizing a power receiving device with a high power supply priority level, and also attempting to supply power in parallel to the plurality of power receiving devices, the power supply loss is further controlled so as not to exceed the allowed power supply loss. Consequently, it is possible to avoid the occurrence of a hindrance to the operation of the power supply device due to generated heat in the power supply device exceeding the allowed amount.

Fourth Embodiment

Next, one example of an embodiment of the disclosed technology, namely a fourth embodiment, will be described. Description will be omitted for the configuration and action which are similar to the first embodiment. In step 106 of FIG. 6, an example of setting the order in which a response, namely information, is received from a power receiving devices 20 in step 104 as the power supply priority level of the power receiving device 20 is described.

Figure 21:
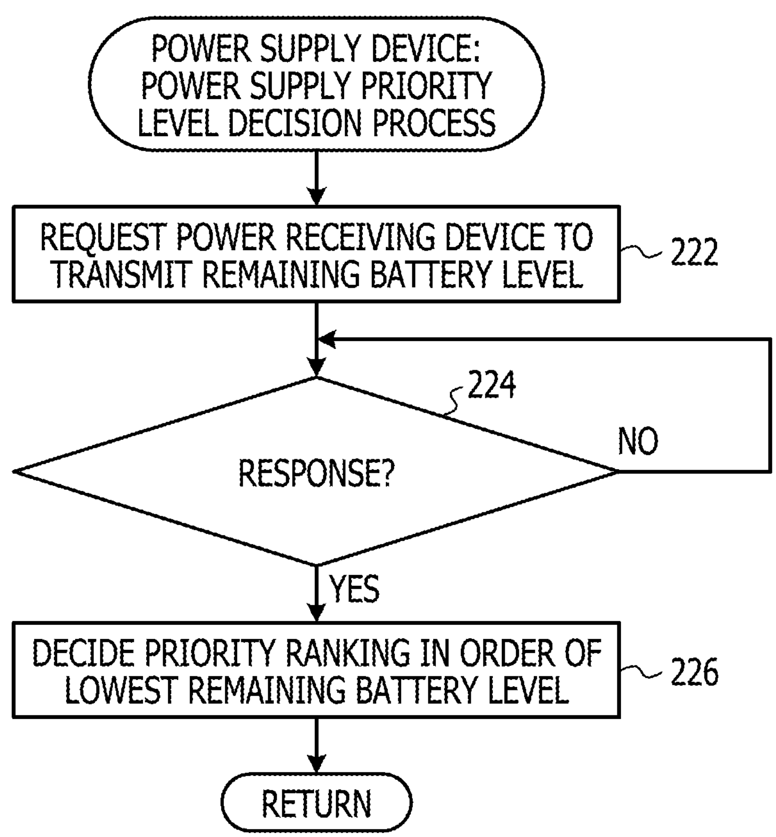
FIG. 21 is a flowchart illustrating one example of a power supply priority level decision process by the power supply device according to a fourth embodiment.
Figure 22:
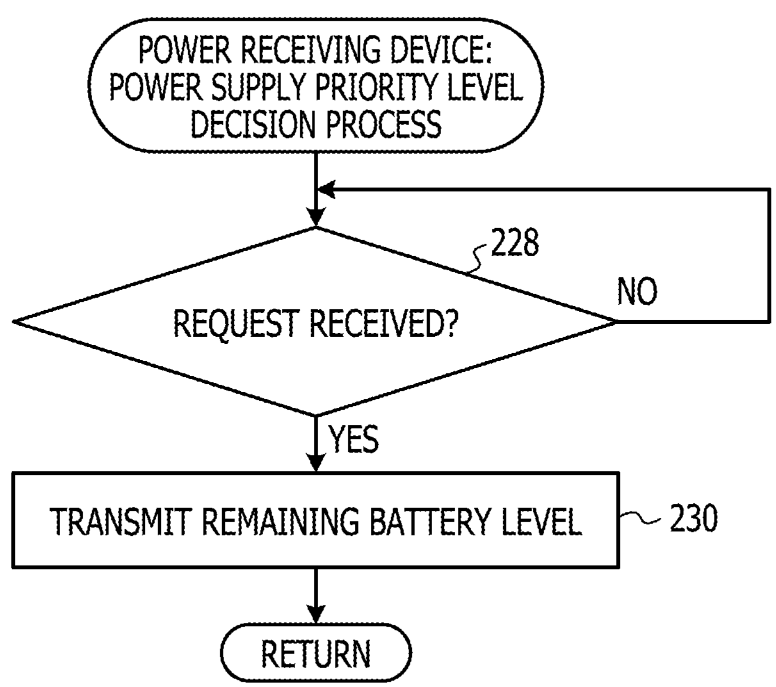
FIG. 22 is a flowchart illustrating one example of a power supply priority level decision process by the power receiving device according to the fourth embodiment.

In the fourth embodiment, a power supply priority level decision process exemplified in FIG. 21 is performed instead of step 106 of FIG. 6. In step 222, the power supply control unit 14 of the power supply device 10 uses the communication circuit 38 and the communication antenna 40 to request a power receiving device 20 with a power supply target flag of 1 to transmit the remaining battery level of the power receiving device 20. In step 228 of FIG. 22, the power receiving control unit 24 of the power receiving device 20 stands by until a request from the power supply device 10 is received. In step 228, if the power receiving control unit 24 determines that a request from the power supply device 10 has been received using the communication circuit 58 and the communication antenna 60, in step 230, the power receiving control unit 24 transmits the remaining battery level to the power supply device 10.

In step 226, the power supply control unit 14 of the power supply device 10 decides the power supply priority level in order of lowest remaining battery level, as exemplified in FIG. 23A. Herein, the lower the remaining battery level, the higher the power supply priority level is set. For example, the power supply priority level of the power receiving device 20 (D2) with a remaining battery level of 20% is set to first, and the power supply priority level of the power receiving device 20 (D3) with a remaining battery level of 30% is set to second.

In the above, a case of applying the fourth embodiment to the first embodiment is described, but the fourth embodiment may also be applied to the second embodiment and the third embodiment. Also, in the above, the power supply priority level is decided based on the remaining battery level, but the present embodiment is not limited thereto. Instead of the remaining battery level, the power supply priority level may be decided based on the time until the start of use of the power receiving device 20, or in other words, the time available for power supply, as exemplified in FIG. 23B. Herein, for example, the shorter the time available for power supply, the higher the power supply priority level is set. Also, as exemplified in FIG. 23C, the power supply priority level may be decided based on a priority level set by the user in advance. In this case, for example, the higher the priority level, the higher the power supply priority level is set.

Note that in the case in which the plurality of power receiving devices 20 have the same remaining battery level, time until the start of use, or priority level, the power supply priority levels of the plurality of power receiving devices 20 are decided based on the order in which responses are received from the power receiving devices 20.

In the present embodiment, it is possible to decide power supply priority levels flexibly, making it possible to perform the parallel power supply control process suited to the user's goals. In the present embodiment, by performing a parallel power supply control as above, it becomes possible to perform power supply that gives priority to power receiving devices with a high power supply priority level, and in addition, in the case of attempting to supply power in parallel to the plurality of power receiving devices, it becomes possible to utilize the power supply capacity of the power supply device effectively. In the case of performing power supply by prioritizing a power receiving device with a high power supply priority level, and also attempting to supply power in parallel to the plurality of power receiving devices, the power supply loss is further controlled so as not to exceed the allowed power supply loss. Consequently, it is possible to avoid the occurrence of a hindrance to the operation of the power supply device due to generated heat in the power supply device exceeding the allowed amount.

Note that the above describes a mode in which power supplied from the power supply device 10 to the power receiving device 20 is used to charge the secondary battery 68 of the power receiving device 20, but is not limited thereto. Power supplied from the power supply device 10 to the power receiving device 20 may also be used for the operation of the power receiving device 20 (operation other than the operation of the power receiving control unit 24 or communication with the power supply device 10).

The above describes a mode in which the highest-priority power receiving device is fixed, but is not limited thereto. For example, the highest-priority power receiving device may also be switched depending on the combination of power receiving devices 20 acting as the power supply target candidates (specifically, the power receiving device 20 with the lowest remaining battery level among the power supply target candidates is treated as the highest-priority power receiving device).

Also, setting a power supply priority level to individual power receiving devices 20 is not a requirement of the disclosed technology. For example, the disclosed technology is also applicable to the case of dividing the plurality of power receiving devices 12 into two or more groups, and supplying power sequentially to each group. In this case, the power receiving devices 20 are grouped so that the supplied power never exceeds the power supply capacity, and also so that the supplied power loss never exceeds the allowed supplied power loss.

[Characteristics of Power Supply Efficiency of Magnetic Resonance Power Supply Device]

With magnetic resonance methods that realize 3D wireless power supply, for example, the power supply efficiency changes depending on the distance from the power supply device to the power receiving device. Furthermore, the power supply efficiency also changes depending on the angle formed between the power transmitting antenna (coil) included in the power supply device and the power receiving antenna (coil) included in the power receiving device, misalignment of the central axes, and the like.

Even if the positional relationship between the power supply device and the power receiving device, the angle formed between the power transmitting antenna included in the power supply device and the power receiving antenna included in the power receiving device, misalignment of the central axes, and the like are similar, the power supply efficiency is different between the case in which a power receiving device that receives power from the power supply device other than the above power receiving device exists, and the case of a single power receiving device. This is because of various factors, such as the influence due to coupling between the power receiving devices, the influence of the load which depends on the supplied power, the non-linearity of relationship between kQ (where k is the coil coupling coefficient and Q is a dimensionless number expressing the oscillation of a resonance circuit) and the power supply efficiency.

Figure 24:
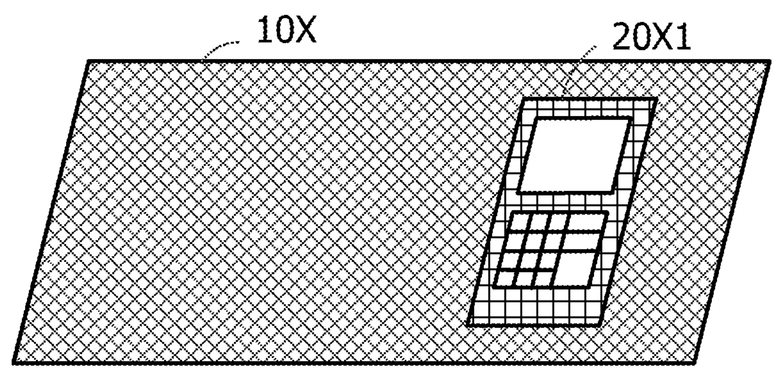
FIG. 24 is a conceptual diagram for explaining characteristics of the power supply efficiency of a magnetic resonance power supply device.
Figure 25:
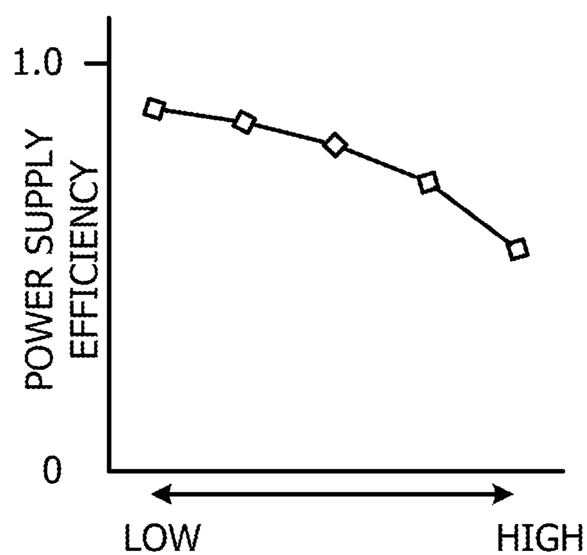
FIG. 25 is a graph for explaining characteristics of the power supply efficiency of a magnetic resonance power supply device.

As exemplified in FIG. 24, a case in which a power receiving device 20X1 is placed on the top face of a magnetic resonance power supply device 10X will be examined. The power supply device 10X is a horizontally oriented power supply device, and the top face is the power supply availability zone. As exemplified in FIG. 25, if the height of the power receiving device 20X1 is raised, the power supply efficiency to the power receiving device 20X1 is lowered. As exemplified in FIG. 26, in the case in which a power receiving device 20X2 is placed on the top face of the power supply device 10X in addition to the power receiving device 20X1, it is assumed that the power supply efficiencies of the power receiving device 20X1 and the power receiving device 20X2 change independently. In this case, if only the height of the power receiving device 20X2 is raised, as exemplified in FIG. 27A, the power supply efficiency 234 of the power receiving device 20X2 is lowered, but the power supply efficiency 232 of the power receiving device 20X1 does not change.

Figure 27A:
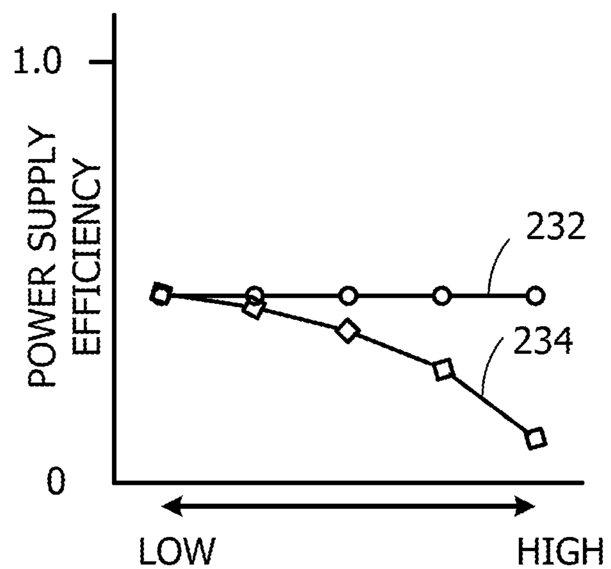
FIG. 27A is a graph for explaining characteristics of the power supply efficiency of a magnetic resonance power supply device.
Figure 27B:
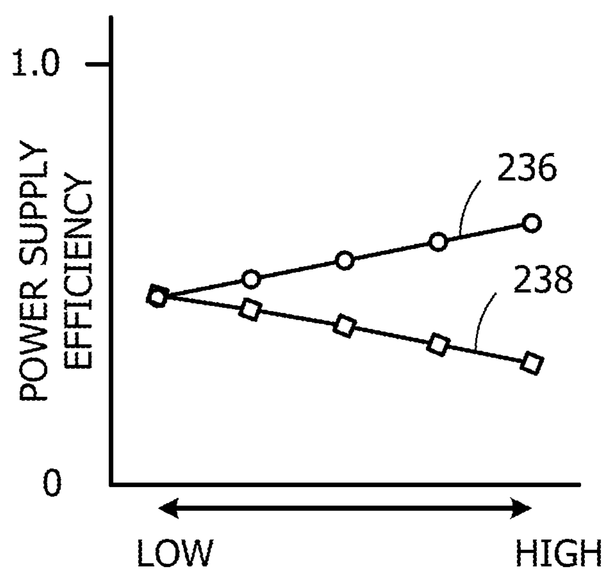
FIG. 27B is a graph for explaining characteristics of the power supply efficiency of a magnetic resonance power supply device.

However, in actuality, if only the height of the power receiving device 20X2 is raised, as exemplified in FIG. 27B, the power supply efficiency 238 of the power receiving device 20X2 is lowered, while on the other hand, the power supply efficiency 236 of the power receiving device 20X1 increases. In this way, the power supply efficiencies of the power receiving device 20X1 and the power receiving device 20X2 do not change independently.

Figure 26:
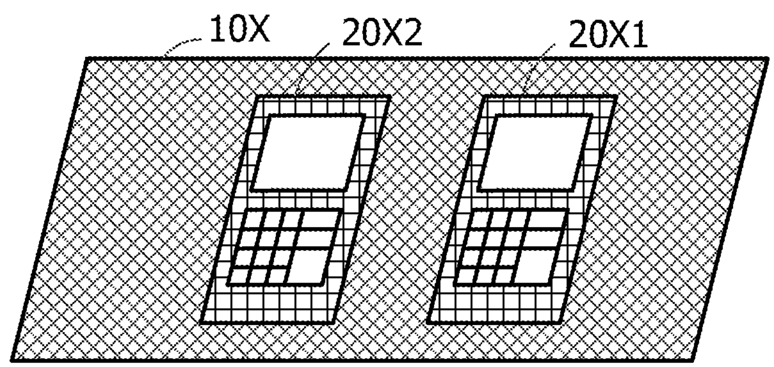
FIG. 26 is a conceptual diagram for explaining characteristics of the power supply efficiency of a magnetic resonance power supply device.
Figure 28:
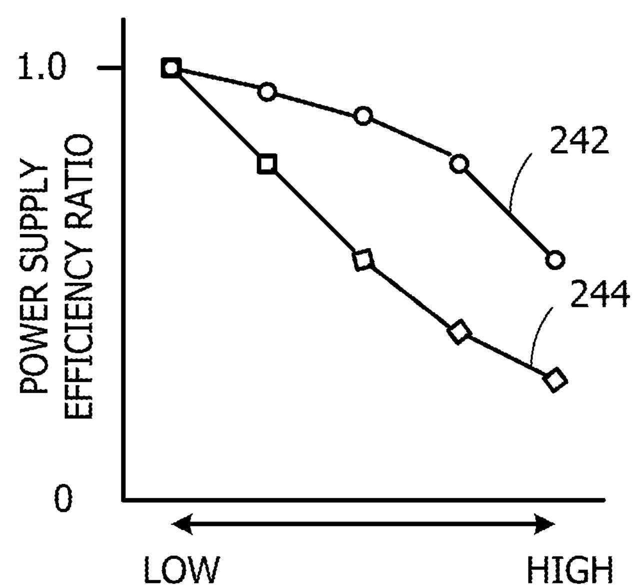
FIG. 28 is a graph for explaining characteristics of the power supply efficiency ratio of a magnetic resonance power supply device.

Also, as exemplified in FIG. 26, the power supply efficiency ratio 242 in the case of supplying power singly to the power receiving device 20X1 and the power receiving device 20X2 is different from the power supply efficiency ratio 244 in the case of supplying power in parallel to the power receiving device 20X1 and the power receiving device 20X2. The power supply efficiency ratio is the power supply efficiency of the power receiving device 20X2 with respect to the power supply efficiency of the power receiving device 20X1, and FIG. 28 illustrates the variation in the power supply efficiency ratio in the case of raising only the height of the power receiving device 20X2. In this way, it is difficult to predict the power supply efficiency to a power receiving device in the case of supplying power in parallel to the plurality of power receiving devices from the power supply efficiency to a power receiving device in the case of supplying power to a single power receiving device. In other words, it is difficult to simply compute the supplied power to a power receiving device in the case of supplying power in parallel to the plurality of power receiving devices from the supplied power to a power receiving device in the case of supplying power to a single power receiving device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic resonance power supply apparatus comprising:

a communication circuit configured to receive, from a highest-priority power receiving device having a highest power supply priority level from among a plurality of power receiving devices inside a power supply availability zone, information enabling computation of a power supply efficiency of the highest-priority power receiving device when supplying power to the power receiving devices as power supply targets including the highest-priority power receiving device;

a power supply circuit configured to supply power to a plurality of power receiving devices; and a processor configured to:

compute the power supply efficiency of the highest-priority power receiving device when supplying power to the power receiving devices as the power supply targets including the highest-priority power receiving device, from the information received by the communication device, and decide, based on the computed power supply efficiency of the highest-priority power receiving device, the power receiving devices as the power supply targets so that an estimated supplied power is within a power supply capacity of the power supply circuit when supplying power to the power receiving devices as the power supply targets including the highest-priority power receiving device, and control power supply so as to supply power to the decided the power receiving devices as power supply targets.

2. The magnetic resonance power supply apparatus according to claim 1, wherein the processor computes the estimated supplied power using the power supply efficiency of the highest-priority power receiving device, and when the computed estimated supplied power is less than the power supply capacity of the power supply circuit, the processor adds a power receiving device other than the highest-priority power receiving device to the power supply target in order of highest power supply priority level until the estimated supplied power exceeds the power supply capacity of the power supply circuit, and thereby decides the power receiving devices as the power supply targets so that the estimated supplied power is maximized and also so that the estimated supplied power remains within the power supply capacity of the power supply circuit.

3. The magnetic resonance power supply apparatus according to claim 2, wherein when the estimated supplied power while supplying power to the power receiving devices as the power supply targets exceeds the power supply capacity of the power supply circuit, instead of the power receiving device with the lowest power supply priority level among the power receiving devices as the power supply targets, the processor includes, into the power supply targets, the power receiving device selected in order of highest power supply priority level from the power receiving devices not included in the power supply targets, and repeats until the estimated supplied power becomes less than or equal to the power supply capacity of the power supply circuit.

4. The magnetic resonance power supply apparatus according to claim 1, wherein the communication circuit receives the information from each of the plurality of power receiving devices, and from the information received by the communication circuit, the processor computes the power supply efficiency of each of the power receiving devices as the power supply targets when supplying power to the power receiving devices as the power supply targets, computes a supplied power loss on the basis of the computed power supply efficiency, and decides the power receiving devices as the power supply targets so that the computed supplied power loss does not exceed an allowed power supply loss, and so that the estimated supplied power is maximized while also remaining within the power supply capacity of the power supply circuit.

5. The magnetic resonance power supply apparatus according to claim 1, wherein the magnetic resonance power supply apparatus supplies a test power of a predetermined value to power receiving devices as power supply target candidates, the communication circuit receives a rated received power and a received power of the highest-priority power receiving device as the information from the highest-priority power receiving device included among the power supply target candidates, and the processor computes the power supply efficiency of the highest-priority power receiving device on the basis of the received power of the highest-priority power receiving device received by the communication circuit and the test power, and computes the estimated supplied power on the basis of the rated received power and the computed power supply efficiency of the highest-priority power receiving device when supplying power to the power receiving devices as the power supply target candidates.

6. The magnetic resonance power supply apparatus according to claim 4, wherein the magnetic resonance power supply apparatus supplies a test power of a predetermined value to the power receiving devices as power supply target candidates, the communication circuit receives a rated received power of the highest-priority power receiving device as the information from the highest-priority power receiving device included among the power supply target candidates, and receives a received power of each of the power receiving devices as the information from each of the power receiving devices included among the power supply target candidates, and the processor computes the power supply efficiency of the highest-priority power receiving device on the basis of the received power of the highest-priority power receiving device received by the communication circuit and the test power, computes the estimated supplied power on the basis of the rated received power and the computed power supply efficiency of the highest-priority power receiving device when supplying power to the power receiving devices as the power supply target candidates, computes the power supply efficiency of each of the power receiving devices on the basis of a sum of the received power received from each of the power receiving devices and the test power, to compute an estimated received power on the basis of multiplies the computed power supply efficiency of each of the power receiving devices by the estimated supplied power when supplying power to the power receiving devices power supply target candidates, and subtracts the estimated received power from the estimated supplied power to compute the supplied power loss.

7. The magnetic resonance power supply apparatus according to claim 1, further comprising:

a storage that stores in advance power supply efficiencies of each power receiving device associated with a distance from the magnetic resonance power supply apparatus, and a direction and an attitude with respect to the magnetic resonance power supply apparatus, of each of the power receiving devices, wherein the communication circuit receives a rated received power of the highest-priority power receiving device as the information from the highest-priority power receiving device included among power supply target candidates, and receives status information regarding each of the power receiving devices as the information from each of the power receiving devices included among the power supply target candidates, and the processor acquires a power supply efficiency of the highest-priority power receiving device from the power supply efficiencies stored in the storage, based on the distance, direction, and attitude of each of the power receiving devices acquired based on the status information, and computes the estimated supplied power on the basis of the rated received power and the power supply efficiency of the highest-priority power receiving device.

8. The magnetic resonance power supply apparatus according to claim 4, further comprising:

a storage that stores in advance power supply efficiencies of each power receiving device associated with a distance from the magnetic resonance power supply apparatus, and a direction and an attitude with respect to the magnetic resonance power supply apparatus, of each of the power receiving devices, wherein the communication circuit receives a rated received power of the highest-priority power receiving device as the information from the highest-priority power receiving device included among power supply target candidates, and receives status information regarding each of the power receiving devices as the information from each of the power receiving devices included among the power supply target candidates, and the processor acquires a power supply efficiency of the highest-priority power receiving device from the power supply efficiencies stored in the storage, based on the distance, direction, and attitude of each of the power receiving devices acquired based on the status information, to compute the estimated supplied power on the basis of the rated received power and the power supply efficiency of the highest-priority power receiving device, computes an estimated received power on the basis of multiplication a sum of the respective power supply efficiencies of the power receiving devices included in the power supply targets by the estimated supplied, and computes the supplied power loss on the basis of subtraction the estimated received power from the estimated supplied power.

9. The magnetic resonance power supply apparatus according to claim 1, wherein the power supply priority level is decided based on at least one of an order in which the communication circuit receives the information from the individual power receiving devices in the case of the communication circuit receiving the information from each of the plurality of power receiving devices, a remaining battery level of each power receiving device, a power supply availability time of each power receiving device, and a priority level set in advance by a user.

* * * * *